US012293706B2

(12) United States Patent
Kim et al.

(10) Patent No.: US 12,293,706 B2
(45) Date of Patent: May 6, 2025

(54) SCAN DRIVING CIRCUIT AND DISPLAY DEVICE HAVING THE SAME

(71) Applicant: Samsung Display Co., Ltd., Yongin-si (KR)

(72) Inventors: Eok Su Kim, Yongin-si (KR); Jongdo Keum, Yongin-si (KR); Taesang Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/530,609

(22) Filed: Dec. 6, 2023

(65) Prior Publication Data

US 2024/0282248 A1 Aug. 22, 2024

(30) Foreign Application Priority Data

Feb. 22, 2023 (KR) ........................ 10-2023-0023730

(51) Int. Cl.
*G09G 3/32* (2016.01)
*G09G 3/3266* (2016.01)

(52) U.S. Cl.
CPC ............. *G09G 3/32* (2013.01); *G09G 3/3266* (2013.01); *G09G 2310/0267* (2013.01)

(58) Field of Classification Search
CPC . G09G 3/32; G09G 3/3266; G09G 2310/0267
See application file for complete search history.

(56) References Cited

U.S. PATENT DOCUMENTS

| | | | | |
|---|---|---|---|---|
| 9,202,827 | B2 | 12/2015 | Koyama et al. | |
| 9,711,088 | B2 | 7/2017 | Na et al. | |
| 10,553,147 | B2 * | 2/2020 | Jang | G11C 19/28 |
| 11,127,339 | B2 | 9/2021 | Kim et al. | |
| 11,238,809 | B2 | 2/2022 | Park et al. | |
| 2010/0007635 | A1 * | 1/2010 | Kwon | G09G 3/3677 345/204 |
| 2014/0061653 | A1 * | 3/2014 | Kim | H01L 27/1225 438/158 |
| 2016/0210920 | A1 * | 7/2016 | Kim | G09G 3/3677 |

(Continued)

FOREIGN PATENT DOCUMENTS

| | | |
|---|---|---|
| KR | 10-2020-0135633 | 12/2020 |
| KR | 10-2021-0024382 | 3/2021 |
| KR | 10-2238636 | 4/2021 |

*Primary Examiner* — Ariel A Balaoing
(74) *Attorney, Agent, or Firm* — KILE PARK REED & HOUTTEMAN PLLC

(57) ABSTRACT

A scan driving circuit includes multiple stages. A j-th stage of the stages includes a buffer part electrically connected to an output terminal that operates in response to a potential of a first control node, a holding part electrically connected to the output terminal that operates in response to a potential of a second control node, and an inverter part electrically connected to the first and second control nodes that controls the potentials of the first and second nodes. The inverter part includes a control transistor including a gate electrically connected to the first control node, and a drain electrically connected to a first voltage terminal that receives a first low voltage or a second voltage terminal that receives a second low voltage. The control transistor includes a dummy gate that receives a low voltage lower than or equal to the first and second low voltages.

21 Claims, 12 Drawing Sheets

(56) References Cited

U.S. PATENT DOCUMENTS

| | | | | |
|---|---|---|---|---|
| 2020/0066203 | A1* | 2/2020 | Kim | G09G 3/32 |
| 2020/0333391 | A1* | 10/2020 | Park | G09G 3/3225 |
| 2020/0372851 | A1* | 11/2020 | Kim | G09G 3/2092 |
| 2024/0290246 | A1* | 8/2024 | Seo | G09G 3/3266 |
| 2024/0363078 | A1* | 10/2024 | Kim | G09G 3/3266 |

* cited by examiner

SCAN DRIVING CIRCUIT AND DISPLAY DEVICE HAVING THE SAME

CROSS REFERENCE TO RELATED APPLICATION(S)

This application claims priority to and benefits of Korean Patent Application No. 10-2023-0023730 under 35 U.S.C. § 119, filed on Feb. 22, 2023, in the Korean Intellectual Property Office (KIPO), the entire contents of which are incorporated herein by reference.

BACKGROUND

1. Technical Field

Embodiments relate to a scan driving circuit with an improved reliability and a display device having the same.

2. Description of the Related Art

Multiple pixels are disposed in an effective area of a display panel. Each of the pixels includes a light emitting element and a pixel driving circuit. A scan driving circuit is provided in a non-effective area of the display panel and drives the pixels. The scan driving circuit is formed in the display panel together with the pixel driving circuit through a manufacturing process of the pixel driving circuit.

SUMMARY

The disclosure provides a scan driving circuit with an improved reliability and a display device including the same.

According to an embodiment, a scan driving circuit may include multiple stages. Each of the stages may include a buffer part which is electrically connected to an output terminal and operates in response to a potential of a first control node, a holding part which is electrically connected to the output terminal and operates in response to a potential of a second control node, and an inverter part which is electrically connected to the first and second control nodes and controls the potentials of the first and second control nodes. The inverter part may include a control transistor including a gate electrically connected to the first control node, and a drain electrically connected to a first voltage terminal that receives a first low voltage or a second voltage terminal that receives a second low voltage. The control transistor may further include a dummy gate that receives a low voltage lower than or equal to the first and second low voltages.

A voltage level of the first low voltage may be lower than a voltage level of the second low voltage, and the dummy gate may be electrically connected to the first voltage terminal.

The dummy gate may be electrically connected to a third terminal that receives a third low voltage having a voltage level lower than a voltage level of the first low voltage.

The control transistor may include a first control transistor including a gate electrically connected to the first control node and electrically connected between an inverter voltage terminal and the second voltage terminal and a second control transistor including a gate electrically connected to the first control node and electrically connected between the second control node and the first voltage terminal.

The first control transistor may further include a first dummy gate electrically connected to the first voltage terminal, and the second control transistor may further include a second dummy gate electrically connected to the first voltage terminal.

A voltage level of the first low voltage may be lower than a voltage level of the second low voltage.

The first control transistor may further include a first dummy gate electrically connected to a third voltage terminal that receives a third low voltage, and the second control transistor may further include a second dummy gate electrically connected to the third voltage terminal.

A voltage level of the third low voltage may be lower than a voltage level of the first low voltage, and the voltage level of the first low voltage may be lower than a voltage level of the second low voltage.

The buffer part may include a buffer transistor including a gate electrically connected to the first control node and electrically connected between a clock terminal and the output terminal, and the holding part may include a holding transistor including a gate electrically connected to the second control node and electrically connected between the output terminal and the second voltage terminal.

According to an embodiment, a display device may include multiple pixels disposed on a base layer and a scan driving circuit disposed on the base layer and electrically connected to the pixels. The scan driving circuit may include multiple stages. Each the of stages may include a buffer part which is electrically connected to an output terminal and operates in response to a potential of a first control node, a holding part which is electrically connected to output terminal and operates in response to a potential of a second control node, and an inverter part which is electrically connected to the first and second control nodes and controls the potentials of the first and second control nodes. The inverter part may include a control transistor including a gate electrically connected to the first control node and a drain electrically connected to a first voltage terminal that receives a first low voltage or a second voltage terminal that receives a second low voltage. The control transistor may further include a dummy gate that receives a low voltage lower than or equal to the first and second low voltages.

A voltage level of the first low voltage may be lower than a voltage level of the second low voltage, and the dummy gate may be electrically connected to the first voltage terminal.

The dummy gate may be electrically connected to a third voltage terminal that receives a third low voltage having a voltage level lower than a voltage level of the first low voltage.

The control transistor may include a first control transistor including a gate electrically connected to the first control node and electrically connected between an inverter voltage terminal and the second voltage terminal, and a second control transistor including a gate electrically connected to the first control node and electrically connected between the second control node and the first voltage terminal.

The first control transistor may further include a first dummy gate electrically connected to the first voltage terminal, and the second control transistor may further include a second dummy gate electrically connected to the first voltage terminal.

A voltage level of the first low voltage may be lower than a voltage level of the second low voltage.

The first control transistor may further include a first dummy gate electrically connected to a third voltage terminal that receives a third low voltage, and the second control transistor may further include a second dummy gate electrically connected to the third voltage terminal.

A voltage level of the third low voltage may be lower than a voltage level of the first low voltage, and the voltage level of the first low voltage may be lower than a voltage level of the second low voltage.

The buffer part may include a buffer transistor including a gate electrically connected to the first control node and electrically connected between a clock terminal and the output terminal. The holding part may include a holding transistor including a gate electrically connected to the second control node and electrically connected between the output terminal and the second voltage terminal.

Each of the pixels may include a light emitting element and a pixel circuit part electrically connected to the light emitting element. The pixel circuit part may include at least one transistor and a shielding electrode overlapping a semiconductor pattern of the at least one transistor in a plan view.

The dummy gate and the shielding electrode may be disposed on a same layer.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
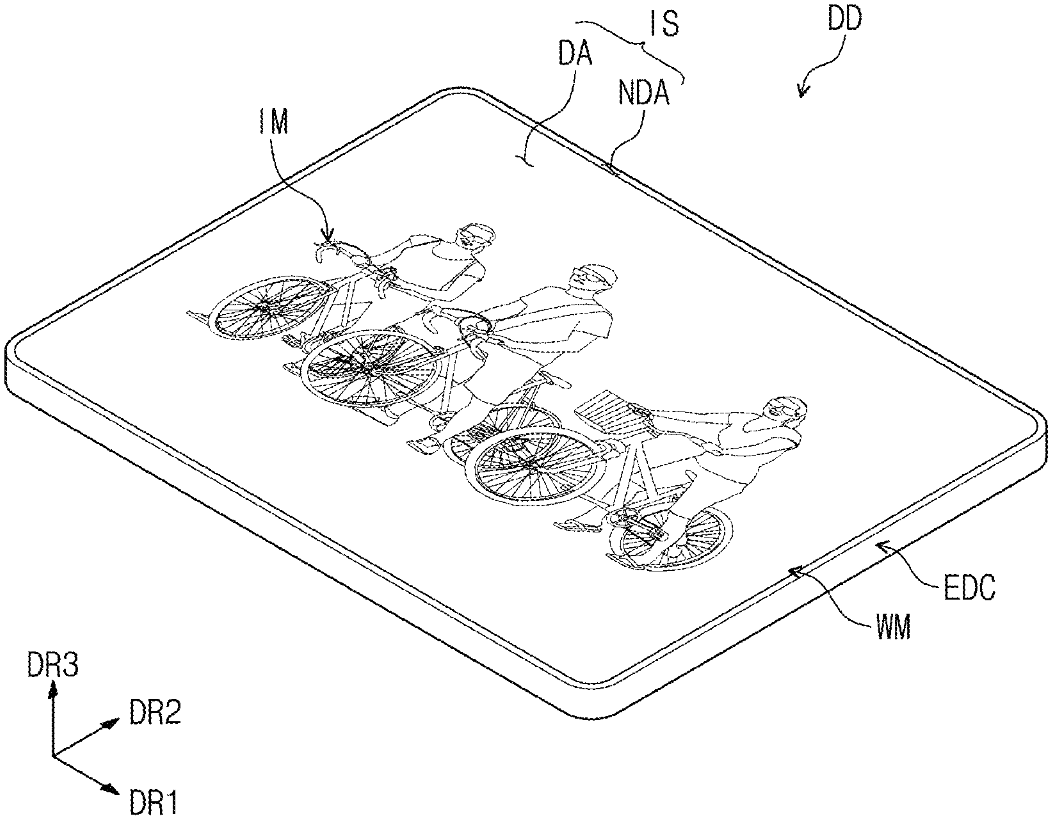
FIG. 1 is a schematic perspective view of a display device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

In the specification, the expression that a first component (or region, area, layer, part, portion, etc.) is "on," "connected with," or "coupled with" a second component means that the first component is directly on, connected with, or coupled with the second component or means that a third component is interposed therebetween. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

When a component is described herein to "connect" another component to the other component or to be "connected to" other components, the components may be connected to each other as separate elements, or the components may be integral with each other.

Throughout the specification, when an element is referred to as being "connected" to another element, the element may be "directly connected" to another element, or "electrically connected" to another element with one or more intervening elements interposed therebetween. Also, when an element is referred to as being "in contact" or "contacted" or the like to another element, the element may be in "electrical contact" or in "physical contact" with another element; or in "indirect contact" or in "direct contact" with another element.

The same reference numerals refer to the same components. Also, in drawings, the thickness, ratio, and dimension of components are exaggerated for effectiveness of description of technical contents. The expression "and/or" includes one or more combinations which associated components are capable of defining. For example, "A and/or B" may be understood to mean "A, B, or A and B." The terms "and" and "or" may be used in the conjunctive or disjunctive sense and may be understood to be equivalent to "and/or."

Although the terms "first," "second," etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

For the purposes of this disclosure, the phrase "at least one of A and B" may be construed as A only, B only, or any combination of A and B. "At least one of X, Y, and Z" and "at least one selected from the group consisting of X, Y, and Z" may be construed as X only, Y only, Z only, or any combination of two or more of X, Y, and Z. Also, "at least two of X, Y, and Z" may be construed as two or more of X, Y, and Z such as both X and Y, both X and Z, both Y and Z, both X, Y, and Z.

Also, the terms "under," "below," "on," "above," etc. are used to describe the correlation of components illustrated in drawings. The terms that are relative in concept are described based on a direction shown in drawings.

Spatially relative terms, such as "lower," "above," "upper," "higher," "side," and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

The first direction DR1, the second direction DR2, and the third direction DR3 are not limited to three axes of a rectangular coordinate system, such as the x, y, and z axes, and may be interpreted in a broader sense. For example, the first direction DR1, the second direction DR2, and the third direction DR3 may be perpendicular to one another, or may represent different directions that are not perpendicular to one another.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some example embodiments may be physically separated into two or more interacting and discrete blocks, units, parts, and/or modules without departing from the scope of the disclosure. Further, the blocks, units, parts, and/or modules of some example embodiments may be physically combined into more complex blocks, units, parts, and/or modules without departing from the scope of the disclosure.

The terminology used herein is for the purpose of describing particular embodiments and is not intended to be limiting. Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Unless otherwise specified, the illustrated embodiments are to be understood as providing example features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

The display surface may be parallel to a surface defined by a first direction DR1 and a second direction DR2. A normal direction of the display surface, i.e., a thickness direction of the display device DD, may indicate a third direction DR3. In this specification, an expression of "when viewed from the top or in a plan view" may represent a case when viewed in the third direction DR3. Hereinafter, a front surface (or a top surface) and a rear surface (or a bottom surface) of each of layers or units may be distinguished by the third direction DR3. However, directions indicated by the first to third directions DR1, DR2, and DR3 may be a relative concept, and converted with respect to each other, e.g., converted into opposite directions.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, embodiments of the disclosure will be described with reference to accompanying drawings.

Figure 2:
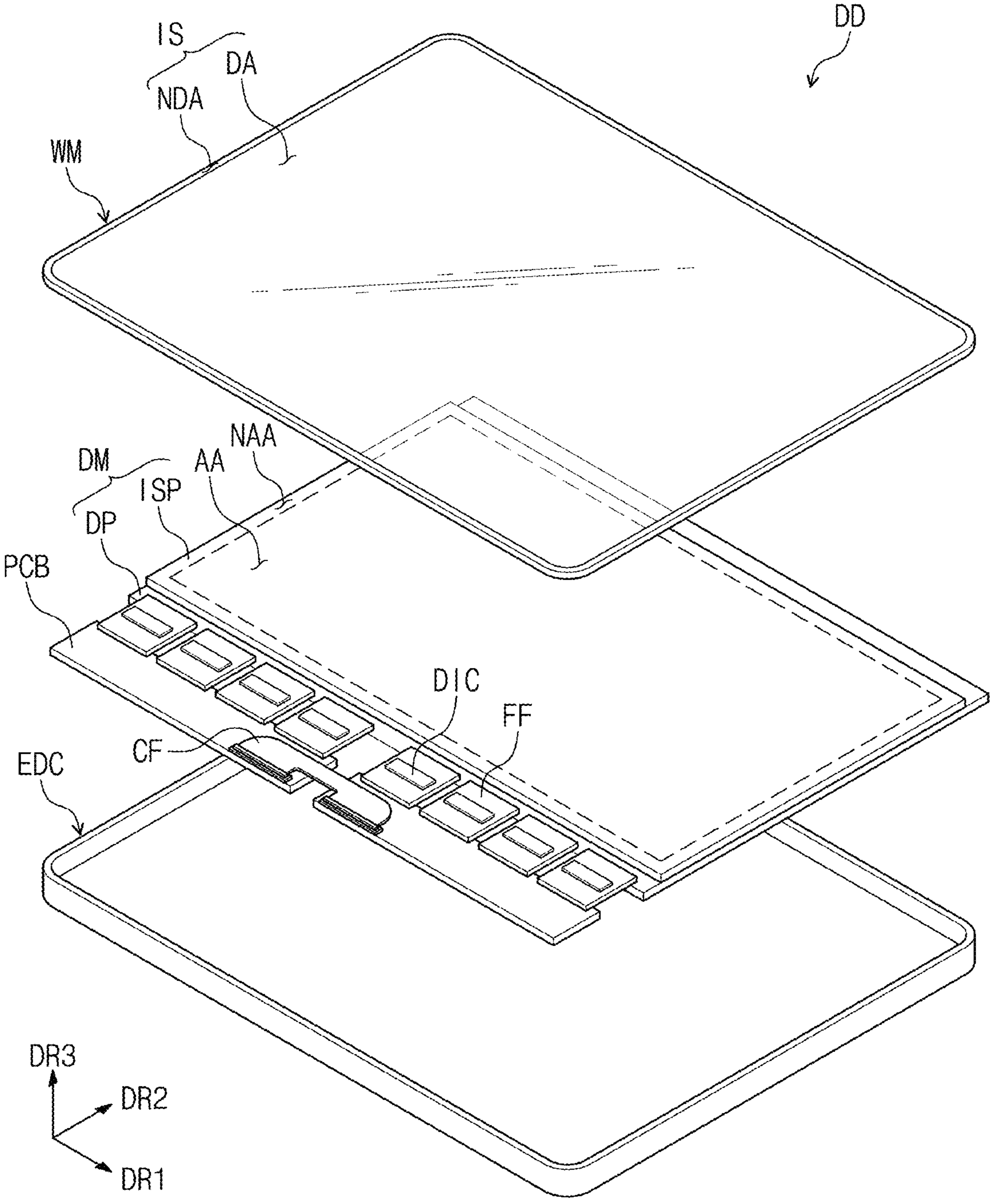
FIG. 2 is a schematic exploded perspective view of a display device according to an embodiment of the disclosure.

FIG. 1 is a schematic perspective view of a display device according to an embodiment of the disclosure. FIG. 2 is a schematic exploded perspective view of a display device according to an embodiment of the disclosure.

Referring to FIGS. 1 and 2, a display device DD may be a device activated according to an electrical signal. The display device DD according to the disclosure may be a small and medium-sized electronic device, such as a mobile phone, a tablet PC, a notebook computer, a vehicle navigation system, a game console, or the like as well as a large-sized electronic device, such as a television, a monitor, or the like. However, the disclosure is limited thereto, in another embodiment, the display device DD may be implemented as another type of a display device without departing from the technical sprit of the disclosure. The display device DD may have a shape of a rectangle having a long side in a first direction DR1 and a short side in a second direction DR2 intersecting the first direction DR1 in a plan view. However, the shape of the display device DD is not limited thereto. In another embodiment, the display device DD may have various shapes. The display device DD may display an image IM on a display surface IS parallel to each of the first direction DR1 and the second direction DR2, and may face a third direction DR3 intersecting the first direction DR1 and the second direction DR2. The display surface IS on which the image IM is displayed may correspond to a front surface of the display device DD.

In an embodiment, a front surface (or an upper or top surface) and a rear surface (or a lower or bottom surface) of each member may be defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Directions that the first, second, and third directions DR1, DR2, and DR3 indicate may be relative and may be changed to different directions.

The display device DD may sense an external input applied from an outside. The external input may include various types of inputs that are provided from the outside of the display device DD. The display device DD according to an embodiment of the disclosure may sense an external input of a user, which is applied from the outside. The external input of the user may be one of various types of external inputs, such as a part of body of the user, light, heat, gaze of the user, pressure, the like, or a combination thereof. Also, the display device DD may sense the external input of the user applied to a side surface or a rear surface of the display device DD depending on a structure of the display device DD and is not limited. In an embodiment, the external input may include an input entered through an input device (e.g., a stylus pen, an active pen, a touch pen, an electronic pen, an E-pen, or the like).

The display surface IS of the display device DD may be divided into (or include) a display area DA and a non-display area NDA. The display area DA may be an area in which the image IM is displayed. A user may perceive (or view) the image IM through the display area DA. In an embodiment, the display area DA may have the shape of a quadrangle whose vertexes are rounded in a plan view. However, the disclosure is not limited thereto. In another embodiment, the display area DA may have various shapes.

The non-display area NDA may be disposed adjacent to the display area DA. The non-display area NDA may have a color (e.g., a given or selectable color). The non-display area NDA may surround the display area DA. Accordingly, a shape of the display area DA may be defined substantially by the non-display area NDA. However, the disclosure is limited thereto. In another embodiment, the non-display area NDA may be disposed adjacent to only one side of the display area DA or may be omitted. The display device DD according to an embodiment of the disclosure may include various embodiments, but the disclosure is not limited thereto.

As illustrated in FIG. 2, the display device DD may include a display module DM and a window WM disposed on the display module DM. The display module DM may include a display panel DP and an input sensing layer ISP.

According to an embodiment of the disclosure, the display panel DP may include a light emitting display panel. For example, the display panel DP may be an organic light emitting display panel, an inorganic light emitting display panel, a quantum dot light emitting display panel, or the like. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, the like, or a combination thereof.

The display panel DP may output the image IM, and the image IM output may be displayed through the display surface IS.

The input sensing layer ISP may be disposed on the display panel DP and may sense an external input. The input sensing layer ISP may be disposed (e.g., directly disposed) on the display panel DP. According to an embodiment of the disclosure, the input sensing layer ISP may be formed on the display panel DP by a subsequent process. For example, in case that the input sensing layer ISP is disposed (e.g., directly disposed) on the display panel DP, an inner adhesive film (not illustrated) may be not interposed between the input sensing layer ISP and the display panel DP. However, the disclosure is not limited thereto. In another embodiment, the inner adhesive film may be interposed between the input sensing layer ISP and the display panel DP, and the input sensing layer ISP may not be manufactured together with the display panel DP through the subsequent processes. For example, the input sensing layer ISP may be manufactured through a process separate from a process of the display panel DP and may be fixed on an upper surface of the display panel DP by the inner adhesive film.

The window WM may be formed of a transparent material capable of outputting the image IM. For example, the window WM may be formed of glass, sapphire, plastic, or the like. In an embodiment, the window WM may have a single layer. However, the disclosure is not limited thereto. In another embodiment, the window WM may include multiple layers.

Although not illustrated, the non-display area NDA of the display device DD described above may correspond to an area that is defined by printing a material including a color (e.g., a given or selectable color) on an area of the window WM. In an embodiment, the window WM may include a window light blocking pattern (not illustrated) for defining the non-display area NDA. The window light blocking pattern that is a colored organic film may be formed, for example, by coating.

The window WM may be coupled to the display module DM by an adhesive film (not illustrated). In an embodiment, the adhesive film may include an optically clear adhesive (OCA) film. However, the adhesive film is not limited thereto. In another embodiment, the adhesive film may include an adhesive or sticking agent. In another embodiment, the adhesive film may include an optically clear resin (OCR), a pressure sensitive adhesive (PSA) film, or the like.

An anti-reflection layer (not illustrated) may be further disposed between the window WM and the display module DM. The anti-reflection layer may decrease a reflectivity of external light incident from above the window WM. The anti-reflection layer according to an embodiment of the disclosure may include a phase retarder and a polarizer. The phase retarder may have a film type or a liquid crystal coating type and may include a $\lambda/2$ phase retarder and/or a $\lambda/4$ phase retarder. The polarizer may also have a film type or a liquid crystal coating type. The film type may include a stretch-type synthetic resin film, and the liquid crystal coating type may include liquid crystals arranged in a direction (e.g., a given or selectable direction). The phase retarder and the polarizer may be implemented with a polarization film.

In an embodiment, the anti-reflection layer may also include color filters. An arrangement of the color filters may be determined according to colors of light generated from multiple pixels (see, e.g., PX of FIG. 3) included in the display panel DP. The anti-reflection layer may further include a light blocking pattern disposed between the color filters.

The display module DM may display the image IM according to an electrical signal and may transmit or receive information about the external input. The display module DM may include an effective area AA and a non-effective area NAA. The effective area AA may be an area (i.e., an area where the image IM is displayed) through which the image IM is output from the display panel DP. Also, the effective area AA may be an area in which the input sensing layer ISP senses the external input applied from an outside. According to an embodiment, the effective area AA of the display module DM may correspond to (or overlap) at least part of the display area DA (or in a plan view).

The non-effective area NAA may be disposed adjacent to the effective area AA. The non-effective area NAA may be an area in which the image IM is not substantially displayed. For example, the non-effective area NAA may surround the effective area AA in a plan view. However, the disclosure is not limited thereto. The non-effective area NAA may have various shapes. According to an embodiment, the non-effective area NAA of the display module DM may correspond to (or overlap) at least part of the non-display area NDA (or in a plan view).

The display device DD may further include multiple flexible films FF connected to the display panel DP. A driver chip DIC may be mounted on each of the flexible films FF. In an embodiment, a source driver (see, e.g., 200 of FIG. 3) may include multiple driver chips DIC, and the driver chips DIC may be each mounted on the flexible films FF.

The display device DD may further include at least one circuit board PCB coupled to the flexible films FF. In an embodiment, two circuit boards PCB may be provided in the display device DD, but the number of circuit boards PCB is not limited thereto. Two adjacent circuit boards among the circuit boards PCB may be electrically connected to each other by a connection film CF. Also, at least one of the circuit boards PCB may be electrically connected to a main board (not illustrated). A driving controller (see, e.g., 100 of FIG. 3) and a voltage generator (see, e.g., 400 of FIG. 3) may be disposed on at least one of the circuit boards PCB.

FIG. 2 illustrates a structure in which the driver chips DIC are mounted on the flexible films FF, but the disclosure is not limited thereto. For example, the driver chips DIC may be mounted (e.g., directly mounted) on the display panel DP. A portion of the display panel DP, on which the driver chip DIC is mounted, may be bent such that the driver chip DIC is disposed on a rear surface of the display module DM.

The input sensing layer ISP may be electrically connected to the circuit board PCB by the flexible films FF. However, the disclosure is not limited thereto. For example, the display module DM may further include a separate flexible film (not illustrated) for electrically connecting the input sensing layer ISP and the circuit board PCB.

The display device DD may further include housing EDC for accommodating the display module DM. The housing EDC may be coupled with the window WM and define an exterior appearance of the display device DD. The housing EDC may absorb external shocks and may prevent a foreign material, moisture, or the like from being infiltrated into the display module DM such that components accommodated in the housing EDC are protected. In an embodiment, the housing EDC may be provided in a form of a combination of multiple accommodating members (not illustrated).

The display device DD according to an embodiment may further include an electronic module (not illustrated) including various functional modules for operating the display module DM, a power supply module (e.g., a battery) for supplying a power necessary for overall operations of the display device DD, a bracket coupled with the display module DM and/or the housing EDC to partition an inner space of the display device DD, the like, or a combination thereof.

Figure 3:
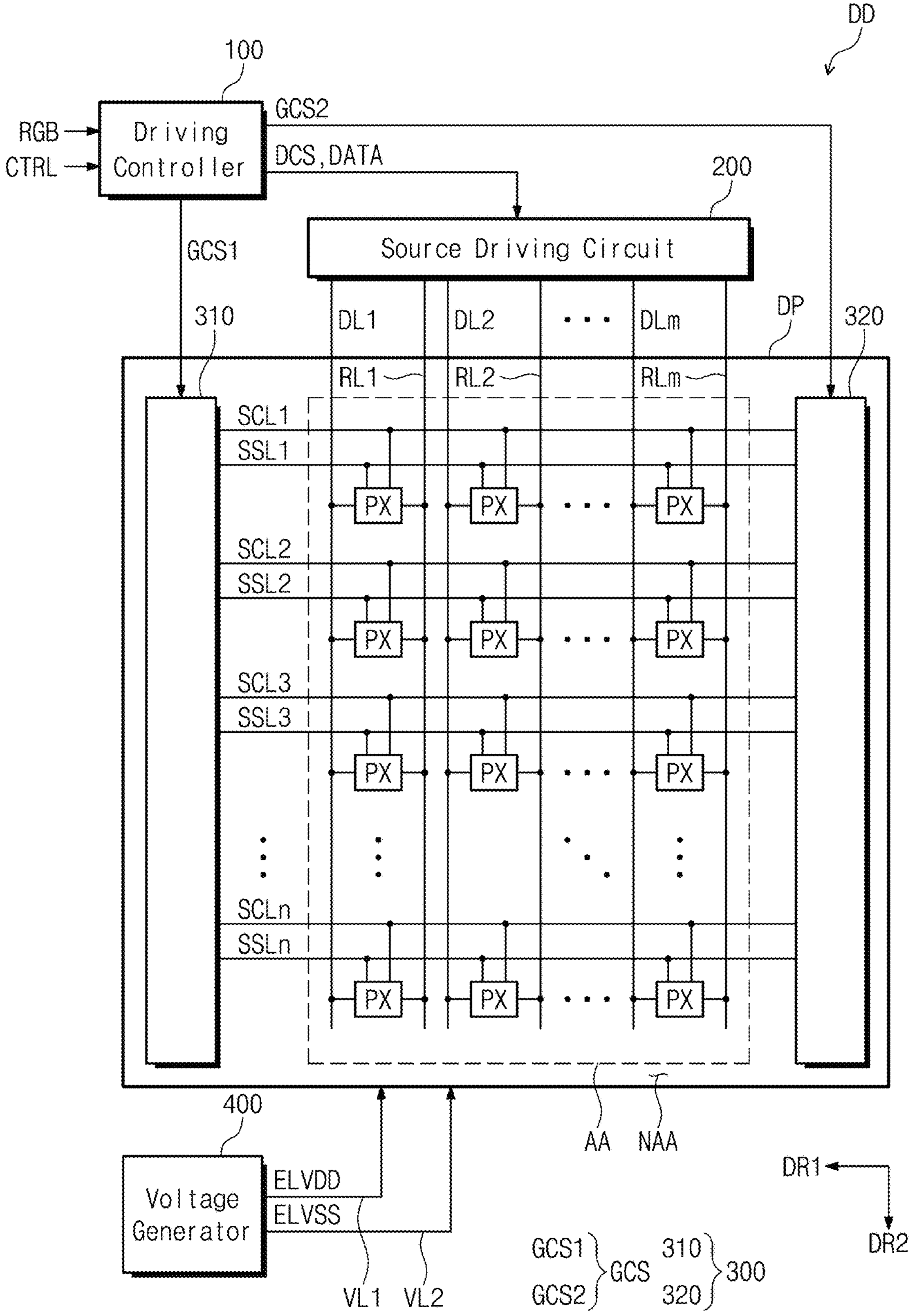
FIG. 3 is a schematic block diagram of a display device according to an embodiment of the disclosure.

FIG. 3 is a schematic block diagram of a display device according to an embodiment of the disclosure.

Referring to FIG. 3, the display device DD may include a driving controller 100, a source driving circuit 200, a scan driving circuit 300, a voltage generator 400, and a display panel DP. In an embodiment, the source driving circuit 200 may include a data driver (not illustrated) and a sensing driver (not illustrated).

The display panel DP may include driving scan lines SCL1 to SCLn, sensing scan lines SSL1 to SSLn, data lines DL1 to DLm, multiple sensing lines RL1 to RLm, and pixels PX. The display panel DP may be divided into (or include) the effective area AA and the non-effective area NAA. The pixels PX may be disposed in the effective area AA. The scan driving circuit 300 may be disposed in the non-effective area NAA.

The driving scan lines SCL1 to SCLn and the sensing scan lines SSL1 to SSLn may extend in parallel with the first direction DR1 and may be arranged spaced from each other in the second direction DR2. The second direction DR2 may be a direction intersecting the first direction DR1. The data lines DL1 to DLm may extend from the source driving circuit 200 in the second direction DR2 and may be arranged spaced from each other in the first direction DR1. The sensing lines RL1 to RLm may extend in the second direction DR2 and may be arranged in the first direction DR1.

The pixels PX may be electrically connected to the driving scan lines SCL1 to SCLn, the sensing scan lines SSL1 to SSLn, the data lines DL1 to DLm, and the sensing lines RL1 to RLm. Each of the pixels PX may be electrically connected with two scan lines (e.g., SCL1 to SCLn, SSL1 to SSLn). However, the number of scan lines electrically connected to each of the pixels PX is not limited thereto. In another embodiment, each pixel PX may be electrically connected to one or three scan lines.

Each of the pixels PX may include a light emitting element (see, e.g., ED of FIG. 4A) and a pixel circuit part (see, e.g., PXC of FIG. 4A) for controlling an emission of the light emitting element ED. The pixel circuit part PXC may include multiple transistors and a capacitor.

The driving controller 100 may receive an input image signal RGB and a control signal CTRL from a main controller (not illustrated) (e.g., a microcontroller or a graphics controller). The driving controller 100 may generate image data DATA by converting the input image signal RGB.

The driving controller 100 may generate a scan control signal GCS and a source control signal DCS based on the control signal CTRL. The source driving circuit 200 may receive the source control signal DCS and the image data DATA from the driving controller 100 and may convert the image data DATA into data signals in response to the source control signal DCS. The source driving circuit 200 may output data signals to the data lines DL1 to DLm. The data signals may be analog voltages corresponding to grayscale values of the image data DATA.

The source driving circuit 200 may be connected to the sensing lines RL1 to RLm. The source driving circuit 200 may further receive a sensing control signal from the driving controller 100 and may sense characteristics of elements included in each of the pixels PX of the display panel DP in response to the sensing control signal.

In an embodiment, the source driving circuit 200 may be formed in a form of at least one chip. For example, the source driving circuit 200 may be disposed in the driver chips (see, e.g., DIC of FIG. 2).

The scan driving circuit 300 may receive the scan control signal GCS from the driving controller 100. The scan driving circuit 300 may output scan signals in response to the scan control signal GCS. In an embodiment, the scan driving circuit 300 may be embedded in the display panel DP. In case that the scan driving circuit 300 is embedded in the display panel DP, the scan driving circuit 300 may include transistors, and the pixel circuit part PXC and the transistors included in the scan driving circuit 300 may be formed through a same process.

The scan driving circuit 300 may generate multiple driving scan signals and multiple sensing scan signals in response to the scan control signal GCS. The driving scan signals may be applied to the driving scan lines SCL1 to SCLn. The sensing scan signals may be applied to the sensing scan lines SSL1 to SSLn.

In an embodiment, the scan driving circuit 300 may include a first scan driving circuit 310 and a second scan driving circuit 320. The first scan driving circuit 310 may be disposed at a side (e.g., a left side) of the effective area AA and the second scan driving circuit 320 may be disposed at another side (e.g., a right side) of the effective area AA. The first scan driving circuit 310 may receive a first scan control signal GCS1 from the driving controller 100 and the second scan driving circuit 320 may receive a second scan control signal GCS2 from the driving controller 100. The first scan driving circuit 310 may generate the driving scan signals and the sensing scan signals in response to the first scan control signal GCS1. The second scan driving circuit 320 may generate the driving scan signals and the sensing scan signals in response to the second scan control signal GCS2.

FIG. 3 illustrates a structure in which the first and second scan driving circuits 310 and 320 are disposed at the left and right sides of the effective area AA, respectively, but the disclosure is not limited thereto. In another embodiment, the scan driving circuit 300 may include only one of the first and second scan driving circuits 310 and 320.

Each of the pixels PX may receive a first driving voltage ELVDD and a second driving voltage ELVSS.

The voltage generator 400 may generate voltages to operate the display panel DP. In an embodiment, the voltage generator 400 may generate the first driving voltage ELVDD and the second driving voltage ELVSS, which are necessary for an operation of the display panel DP. The first driving voltage ELVDD and the second driving voltage ELVSS may be provided to the display panel DP through a first driving voltage line VL1 and a second driving voltage line VL2, respectively.

As well as the first driving voltage ELVDD and the second driving voltage ELVSS, the voltage generator 400 may further generate various voltages (e.g., a gamma reference voltage, a data driving voltage, a gate-on voltage, and a gate-off voltage) for operations of the source driving circuit 200 and the scan driving circuit 300.

Figure 4A:
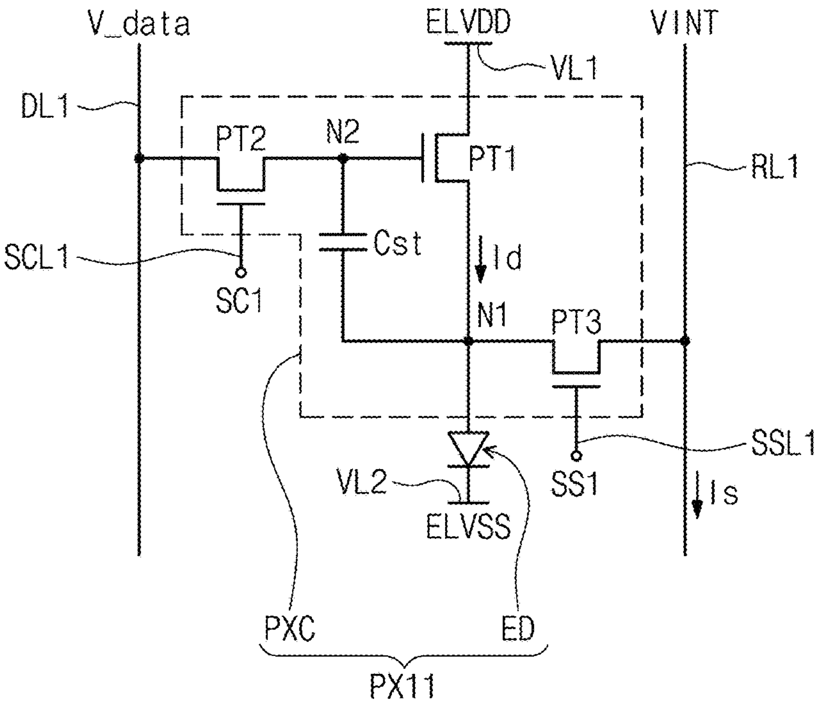
FIG. 4A is a schematic diagram of an equivalent circuit of a pixel according to an embodiment of the disclosure.
Figure 4B:
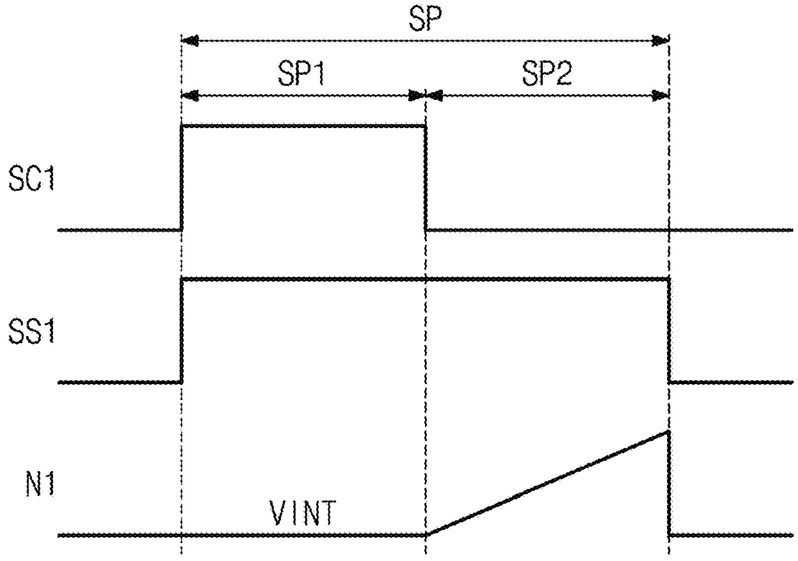
FIG. 4B is a schematic waveform diagram illustrating an operation of a pixel and a sensing period of FIG. 4A.

FIG. 4A is a schematic diagram of an equivalent circuit of a pixel according to an embodiment of the disclosure. FIG. 4B is a schematic waveform diagram illustrating an operation of a pixel and a sensing period of FIG. 4A.

FIG. 4A illustrates a schematic diagram of an equivalent circuit of a first pixel PX11 among the pixels PX of FIG. 1. Because each of the pixels PX has a same circuit structure, a detailed description of remaining pixels PX will be replaced with a description of a circuit structure of the first pixel PX11.

Referring to FIG. 4A, the first pixel PX11 may be electrically connected to the first data line DL1, the first driving scan line SCL1, the first sensing scan line SSL1, and the first sensing line RL1.

The first pixel PX11 may include the light emitting element ED and the pixel circuit part PXC. The light emitting element ED may be a light emitting diode. In an embodiment, the light emitting element ED may be an organic light emitting diode including an organic light emitting layer. The light emitting element ED may be one of a red light emitting diode that emits red light, a green light emitting diode that emits green light, and a blue light emitting diode that emits blue light.

The pixel circuit part PXC may include first to third transistors PT1, PT2, and PT3 and a capacitor Cst. At least one of the first to third transistors PT1, PT2, and PT3 may be a transistor including a low-temperature polycrystalline silicon (LTPS) semiconductor layer. Each of the first to third transistors PT1, PT2, and PT3 may be an N-type transistor. However, the disclosure is not limited thereto. In another embodiment, each of the first to third transistors PT1, PT2, and PT3 may be a P-type transistor. In another embodiment, some of the first to third transistors PT1, PT2, and PT3 may be N-type transistors, and the other(s) of the first to third transistors PT1, PT2, and PT3 may be P-type transistors. In an embodiment, at least one of the first to third transistors PT1, PT2, and PT3 may be a transistor including an oxide semiconductor layer.

FIG. 4A illustrates a configuration of the pixel circuit part PXC, but the disclosure is not limited thereto. The pixel circuit part PXC illustrated in FIG. 4A may be only an example, and in another embodiment, the configuration of the pixel circuit part PXC may be modified and carried out.

In another embodiment, in the pixel circuit part PXC, the third transistor PT3 may be omitted.

The first transistor PT1 may be electrically connected between the first driving voltage line VL1 receiving the first driving voltage ELVDD and the light emitting element ED. The first transistor PT1 may include a first electrode electrically connected to the first driving voltage line VL1, a second electrode electrically connected to an anode of the light emitting element ED, and a third electrode electrically connected to an end of the capacitor Cst. A contact point where the anode of the light emitting element ED is electrically connected to the second electrode of the first transistor PT1 may be a "first node N1". In this specification, "a transistor is connected to a signal line" may mean that one of a first electrode, a second electrode, and a third electrode of the transistor is integrated with a signal line or is connected through a connection electrode. Also, "a transistor is electrically connected to another transistor" may mean that one of a first electrode, a second electrode, and a third electrode of the transistor is integrated with one of a first electrode, a second electrode, and a third electrode of the another transistor, or is electrically connected through a connection electrode".

The first transistor PT1 may receive a data voltage V_data delivered through the first data line DL1 according to a switching operation of the second transistor PT2 and may supply a driving current to the light emitting element ED.

The second transistor PT2 may be electrically connected between the first data line DL1 and the third electrode of the first transistor PT1. The second transistor PT2 may include a first electrode electrically connected to the first data line DL1, a second electrode electrically connected to the third electrode of the first transistor PT1, and a third electrode electrically connected to the first driving scan line SCL1. A contact point to which the second electrode of the second transistor PT2 is electrically connected to the third electrode of the first transistor PT1 may be a "second node N2". The second transistor PT2 may be turned on in response to a first driving scan signal SC1 received through the first driving scan line SCL1 and may deliver the data voltage V_data delivered from the first data line DL1 to the third electrode of the first transistor PT1.

The third transistor PT3 may be electrically connected between the second electrode of the first transistor PT1 and the first sensing line RL1. The third transistor PT3 may include a first electrode electrically connected to the first node N1, a second electrode electrically connected to the first sensing line RL1, and a third electrode electrically connected to the first sensing scan line SSL1. The third transistor PT3 may be turned on in response to a first sensing scan signal SS1 received through the first sensing scan line SSL1 and may electrically connect the first sensing line RL1 and the first node N1.

The end of the capacitor Cst may be electrically connected to the second node N2, and another end of the capacitor Cst may be electrically connected to the first node N1. A cathode of the light emitting element ED may be electrically connected to the second driving voltage line VL2 through which the second driving voltage ELVSS is delivered. A voltage level of the second driving voltage ELVSS may be lower than a voltage level of the first driving voltage ELVDD.

The light emitting element ED may include the anode electrically connected to the second electrode (or the first node N1) of the first transistor PT1 and the cathode receiving the second driving voltage ELVSS. The light emitting element ED may generate light corresponding to an amount of current supplied from the first transistor PT1.

Referring to FIGS. 4A and 4B, during a sensing period SP, the first driving scan signal SC1 may be applied to the first driving scan line SCL1, and the first sensing scan signal SS1 may be applied to the first sensing scan line SSL1. A duration of the sensing period SP may be greater than a duration of an activation period of at least one sensing scan signal (e.g., the first sensing scan signal SS1) among sensing scan signals. An activation period of the first driving scan signal SC1 may overlap an activation period of the first sensing scan signal SS1. In an embodiment, the activation period of the first sensing scan signal SS1 may have longer duration (e.g., twice) than the activation period of the first driving scan signal SC1. In an embodiment, the activation period may be a high level period.

The sensing period SP may include a write period SP1, in which the first driving scan signal SC1 and the first sensing scan signal SS1 are simultaneously activated, and a readout period SP2 in which only the first sensing scan signal SS1 is activated.

During the write period SP1, the second transistor PT2 may be turned on in response to the first driving scan signal SC1, and the third transistor PT3 may be turned on in response to the first sensing scan signal SS1.

A sensing data voltage V_data may be applied to the second node N2 (i.e., the third electrode of the first transistor PT1) through the first data line DL1 and the turned-on second transistor PT2. The sensing data voltage V_data may be a voltage applied to the data lines DL1 to DLm during the sensing period SP and may be a voltage set for sensing a current. An initialization voltage VINT may be applied to the first node N1 (i.e., the second electrode of the first transistor PT1 or the anode of the light emitting element ED) through the first sensing line RL1 and the turned-on third transistor PT3. The initialization voltage VINT may be a voltage for initializing the first node N1.

A voltage between the first node N1 and the second node N2 may be set as a difference between the sensing data voltage V_data and the initialization voltage VINT. Electric charges corresponding to the difference between the sensing data voltage V_data and the initialization voltage VINT may be charged in the capacitor Cst. A voltage between the first node N1 and the second node N2 may be a gate-source voltage of the first transistor PT1.

After the write period SP1 ends, the first driving scan signal SC1 may be deactivated, and the second transistor PT2 may be turned off. Even though the second transistor PT2 is turned off, the voltage between the first node N1 and the second node N2 may be maintained by the capacitor Cst during the readout period SP2.

Because the voltage between the first node N1 and the second node N2 is greater than a threshold voltage of the first transistor PT1, a current (hereinafter referred to as a "drain current Id") may flow through the first transistor PT1 during the readout period SP2. During the readout period SP2, a potential of the first node N1 may be boosted by the drain current Id while the voltage between the first node N1 and the second node N2 is maintained. During the readout period SP2, the drain current Id may be output (or flow) to the first sensing line RL1 through the turned-on third transistor PT3. A current output (or flowing) through the first sensing line RL1 may be a "sensing current Is" (or a sensing signal).

Figure 5:
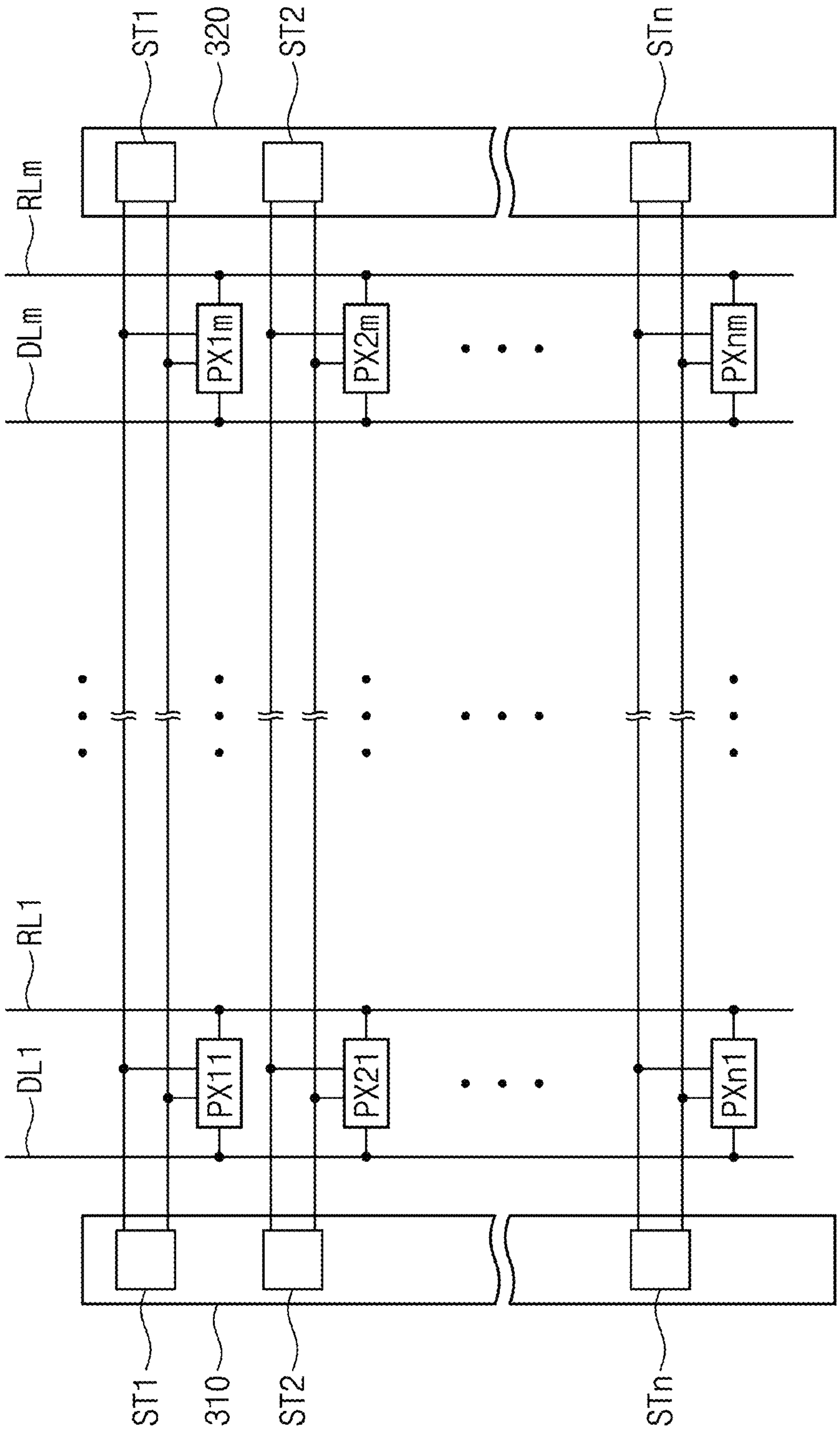
FIG. 5 is a schematic block diagram of a scan driving circuit and a pixel according to an embodiment of the disclosure.
Figure 6:
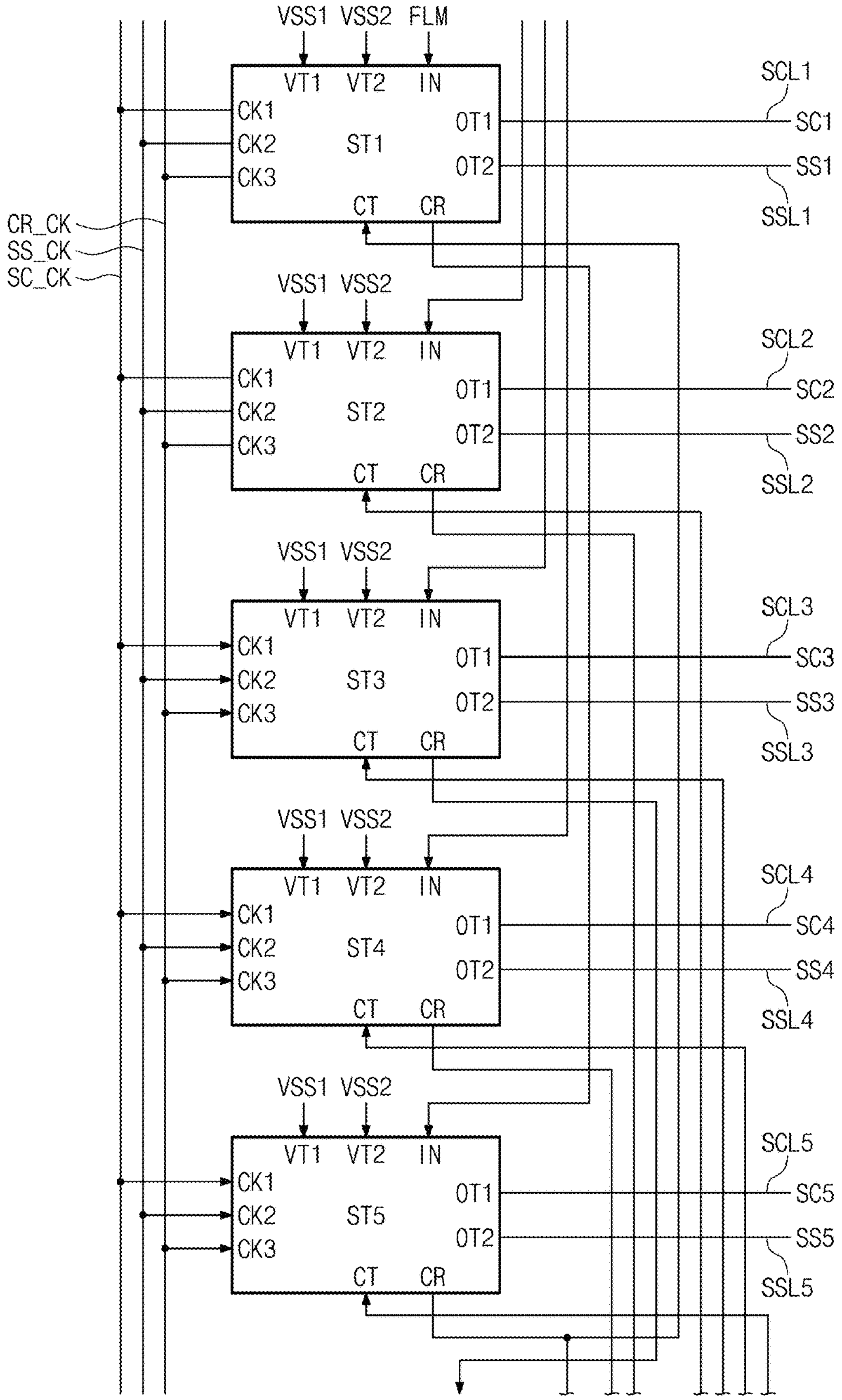
FIG. 6 is a schematic block diagram of a first scan driving circuit of FIG. 5.

FIG. 5 is a schematic block diagram of a scan driving circuit and a pixel according to an embodiment of the disclosure, and FIG. 6 is a schematic block diagram of a first scan driving circuit of FIG. 5.

Referring to FIG. 5, among the pixel PX11 to PXnm, pixels (e.g., PX11 to PX1*m*) disposed in a same row may be electrically connected to two scan lines (e.g., the first driving scan line SCL1 and the first sensing scan line SSL1). Among the pixels PX11 to PXnm, pixels (e.g., PX11 to PXn1) disposed in a same column may be electrically connected to a data line (e.g., the first data line DL1) and a sensing line (e.g., the first sensing line RL1).

The first scan driving circuit 310 may be electrically connected to a side of the scan lines (e.g., the driving scan lines SCL1 to SCLn and the sensing scan lines SSL1 to SSLn), and the second driving circuit 320 may be electrically connected to another side of the scan lines SCL1 to SCLn and SSL1 to SSLn.

Each of the first and second scan driving circuits 310 and 320 may include multiple stages ST1 to STn electrically connected to each other. In an embodiment, each of the stages ST1 to STn may output a corresponding driving scan signal and a corresponding sensing scan signal. For example, a first stage ST1 may be electrically connected to the first driving scan line SCL1 and the first sensing scan line SSL1 and output the first driving scan signal SC1 and the first sensing scan signal SS1 to the first driving scan line SCL1 and the first sensing scan line SSL1, respectively. However, the disclosure is not limited thereto. In another embodiment, each of the first and second scan driving circuits 310 and 320 may independently include stages outputting the diving scan signals and stages outputting the sensing scan signals.

For convenience of explanation, FIG. 6 illustrates only five stages ST1, ST2, ST3, ST4, and ST5, but other stages may have a configuration similar to the five stages ST1 to ST5.

Referring to FIG. 6, each of the stages ST1 to ST5 may include an input terminal IN, a control terminal CT, a carry terminal CR, a first output terminal OT1, and a second output terminal OT2. Each of the stages ST1 to ST5 may further include a first clock terminal CK1, a second clock terminal CK2, a third clock terminal CK3, a first voltage terminal VT1, and a second voltage terminal VT2.

The input terminal IN may receive a previous carry signal (or a start signal FLM) output from the carry terminal CR of one of previous stages. The start signal FLM may be a dummy carry signal output from a dummy stage prior to the first stage ST1 or be a signal applied from the driving controller (see, e.g., 100 of FIG. 3). The control terminal CT may receive a next carry signal output from the carry terminal CR of one among next stages.

Each of the stages ST1 to ST5 may receive three clock signals through the first to third clock terminals CK1, CK2, and CK3. The first clock terminal CK1 of each of the stages ST1 to ST5 may receive a driving clock signal SC_CK, the second clock terminal CK2 of each of the stages ST1 to ST5 may receive a sensing clock signal SS_CK, and the third clock terminal CK3 of each of the stages ST1 to ST5 may receive a carry clock signal CR_CK.

The driving clock signal SC_CK and the sensing clock signal SS_CK may have different phases or have a same phase. The driving clock signal SC_CK and the sensing clock signal SS_CK may have different duty ratios or have a same duty ratio. The carry clock signal CR_CK, the driving clock signal SC_CK, and the sensing clock signal SS_CK may have a same phase and a same duty ratio.

A first low voltage VSS1 may be provided to the first voltage terminal VT1 and a second low voltage VSS2 may be provided to the second voltage terminal VT2. Each of the first and second low voltages VSS1 and VSS2 may have a direct current voltage level. The first and second low voltages VSS1 and VSS2 may have different voltage levels. In an embodiment, a voltage level of the first low voltage VSS1 may be lower than a voltage level of the second low voltage VSS2. For example, in case that the first low voltage VSS1 is about −9 volts (V), the second low voltage VSS2 may be about −5 volts (V).

The stages ST1 to ST5 may output the driving scan signal SC1 to SC5 to the driving scan lines SCL1 to SCL5, respectively, and the stages ST1 to ST5 may output the sensing scan signal SS1 to SS5 to the sensing scan lines SSL1 to SSL5, respectively. The first output terminal OT1 and the second output terminal OT2 of the first stage ST1 may be electrically connected to the first driving scan line SCL1 and the first sensing scan line SSL1, respectively, and output the first driving scan signal SC1 and the first sensing scan signal SS1 to the first driving scan line SCL1 and the first sensing scan line SSL1, respectively. The first output terminal OT1 and the second output terminal OT2 of a second stage ST2 may be electrically connected to the second driving scan line SCL2 and the second sensing scan line SSL2, respectively, and output the second driving scan signal SC2 and the second sensing scan signal SS2 to the second driving scan line SCL2 and the second sensing scan line SSL2, respectively.

Figure 7:
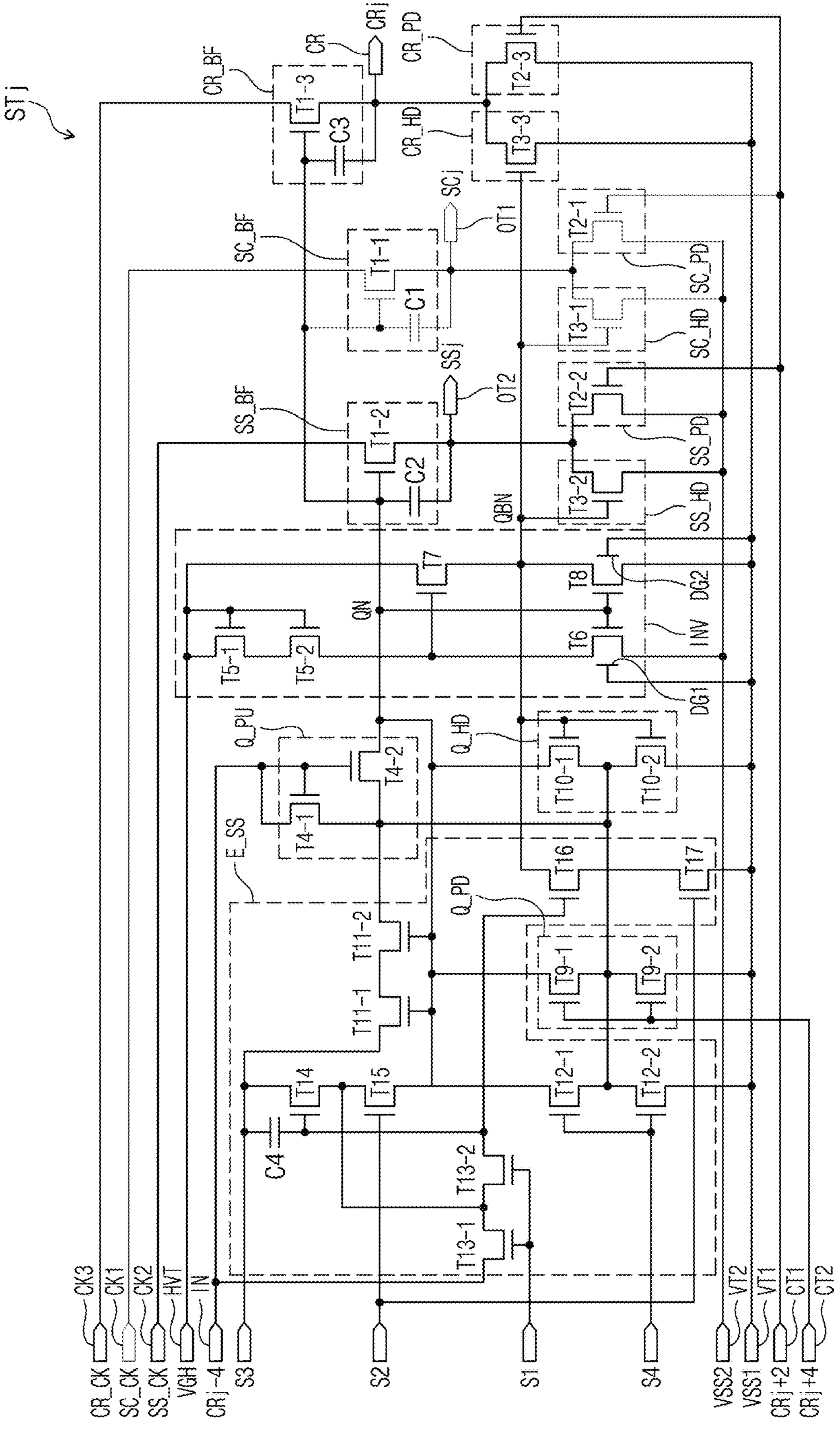
FIG. 7 is a schematic diagram of an equivalent circuit of a j-th stage according to an embodiment of the disclosure.
Figure 8:
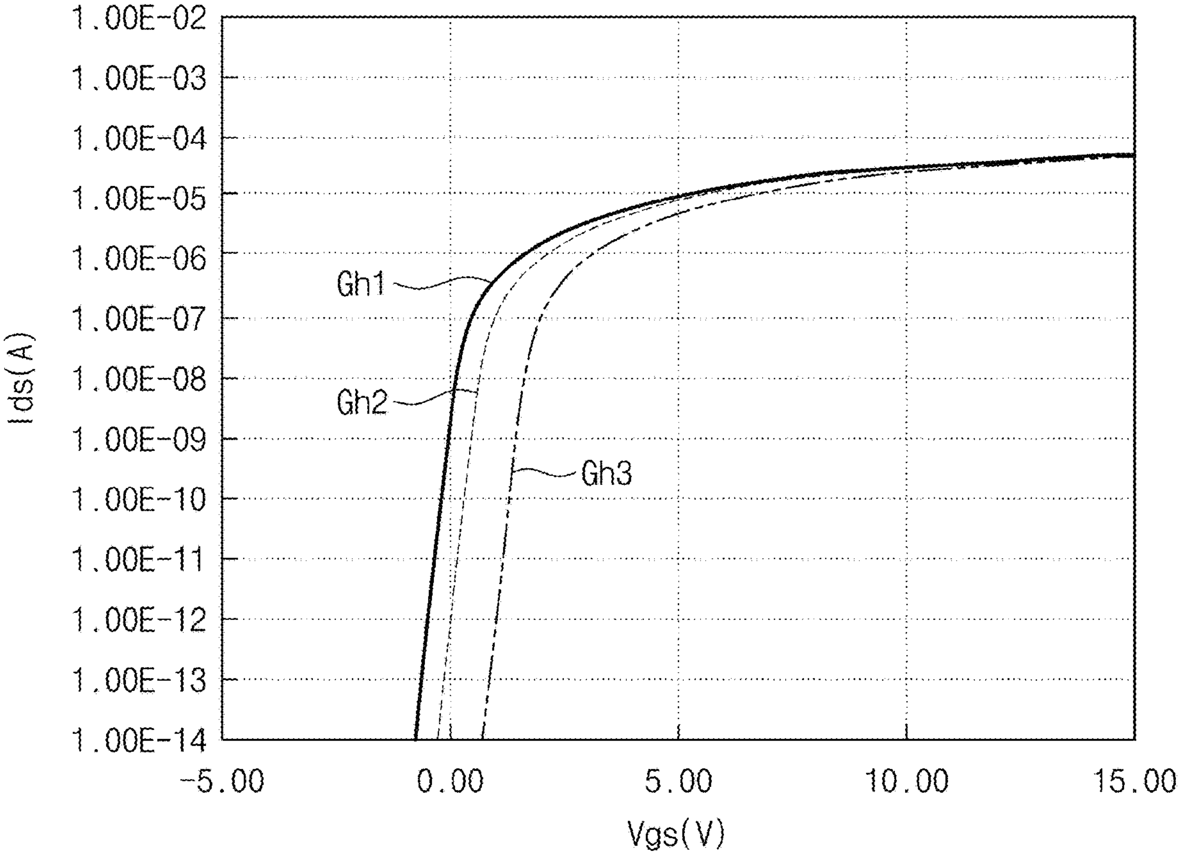
FIG. 8 is a schematic waveform diagram illustrating level of leakage current generated in an inverter part of a scan driving circuit according to an embodiment of the disclosure.

FIG. 7 is a schematic diagram of an equivalent circuit of a j-th stage according to an embodiment of the disclosure. FIG. 8 is a schematic waveform diagram illustrating level of leakage current generated in an inverter part of a scan driving circuit according to an embodiment of the disclosure.

FIG. 7 illustrates a circuit configuration of a j-th stage STj among the stages (see, e.g., ST1 to STn of FIG. 5). The stages ST1 to STn may have a same circuit configuration as each other, so description for circuit configurations of a remaining stages ST1 to STn is omitted to avoid redundancy. j may be a natural number greater than 1 and less than n.

Referring to FIGS. 6 and 7, the j-th stage STj may include multiple buffer parts SC_BF, SS_BF, and CR_BF, multiple holding parts SC_HD, SS_HD, and CR_HD, multiple pull-down parts SC_PD, SS_PD, and CR_PD, an inverter part INV, a node pull-up part Q_PU, a node pull-down part Q_PD, and a node holding part Q_HD.

In an embodiment, the buffer parts SC_BF, SS_BF, and CR_BF may include a first buffer part (or a driving scan buffer part) SC_BF, a second buffer part (or a sensing scan buffer part) SS_BF, and a third buffer part (or a carry buffer part) CR_BF. The pull-down parts SC_PD, SS_PD, and CR_PD may include a first pull-down part (or a driving scan pull-down part) SC_PD, a second pull-down part (or a sensing scan pull-down part) SS_PD, and a third pull-down part (or a carry pull-down part) CR_PD. The holding parts SC_HD, SS_HD, and CR_HD may include a first holding part (or a driving scan holding part) SC_HD, a second holding part (or a sensing scan holding part) SS_HD, and a third holding part (or a carry holding part) CR_HD.

The first buffer part SC_BF may include a first buffer transistor T1-1 and a first capacitor C1, and may be electrically connected between the first output terminal OT1 and the first clock terminal CK1. The second buffer part SS_BF may include a second buffer transistor T1-2 and a second capacitor C2, and may be electrically connected between the second output terminal OT2 and the second clock terminal CK2. The third buffer part CR_BF may include a third buffer transistor T1-3 and a third capacitor C3, and may be electrically connected between the carry terminal CR and the third clock terminal CK3.

Gates of the first to third buffer transistors T1-1, T1-2, and T1-3 may be electrically connected to a first control node QN and may operate in response to a potential of the first control node QN. In case that the potential of the first control node QN rises to a high potential, the first to third buffer transistors T1-1, T1-2, and T1-3 may be turned on. The first output terminal OT1 may output the driving clock signal SC_CK applied through the turned-on first buffer transistor T1-1 as a j-th driving scan signal SCj, the second output terminal OT2 may output the sensing clock signal SS_CK applied through the turned-on second buffer transistor T1-2 as a j-th sensing scan signal SSj. The carry terminal CR may output the carry clock signal CR_CK applied through the turned-on third buffer transistor T1-3 as a j-th carry signal CRj.

The first pull-down part SC_PD may include a first pull-down transistor T2-1 and may be electrically connected between the first output terminal OT1 and the second voltage terminal VT2. The second pull-down part SS_PD may include a second pull-down transistor T2-2 and may be electrically connected between the second output terminal OT2 and the second voltage terminal VT2. The third pull-down part CR_PD may include a third pull-down transistor T2-3 and may be connected between the carry terminal CR and the first voltage terminal VT1.

Gates of the first to third pull-down transistors T2-1, T2-2, and T2-3 may be electrically connected to the first control terminal CT1. In case that a first next carry signal CRj+2 is applied to the gates of the first to third pull-down transistors T2-1, T2-2, and T2-3, the first to third pull-down transistors T2-1, T2-2, and T2-3 may be turned on in response to the first next carry signal CRj+2. Therefore, the j-th driving scan signal SCj of the first output terminal OT1 may be pulled down to the second low voltage VSS2 through the turned-on first pull-down transistor T2-1, the j-th sensing scan signal SSj of the second output terminal OT2 may be pulled down to the second low voltage VSS2 through the turned-on second pull-down transistor T2-2. The j-th carry signal CRj of the carry terminal CR may be pulled down to the first low voltage VSS1 through the turned-on third buffer transistor T2-3.

The first holding part SC_HD may include a first holding transistor T3-1 and may be electrically connected between the first output terminal OT1 and the second voltage terminal VT2. The second holding part SS_HD may include a second holding transistor T3-2 and may be electrically connected between the second output terminal OT2 and the second voltage terminal VT2. The third holding part CR_HD may include a third holding transistor T3-3 and may be electrically connected between the carry terminal CR and the first voltage terminal VT1.

Gates of the first to third holding transistors T3-1, T3-2, and T3-3 may be electrically connected to a second control node QBN and may operate in response to a potential of the second control node QBN. In case that the potential of the second control node QBN rises to a high potential, the first to third holding transistors T3-1, T3-2, and T3-3 may be turned on. Therefore, the j-th driving scan signal SCj of the first output terminal OT1 may be held as the second low voltage VSS2 through the turned-on first holding transistor T3-1, the j-th sensing scan signal SSj of the second output terminal OT2 may be held as the second low voltage VSS2 through the turned-on second holding transistor T3-2. The j-th carry signal CRj of the carry terminal CR may be held as the first low voltage VSS1 through the turned-on third holding transistor T3-3. As the potential of the second control node QBN is maintained at a high potential even after the first to third pull-down parts SC_PD, SS_PD, and CR_PD are turned off, the first to third holding parts SC_HD, SS_HD, and CR_HD may be maintained at a turned-on state. As a result, the j-th driving scan signal SCj and the j-th sensing scan signal SSj may be maintained at the second low voltage VSS2 and the j-th carry signal CRj may be maintained at the first low voltage VSS1.

The inverter part INV may include a first inverter transistor T5-1 and T5-2, a second inverter transistor T6, a third inverter transistor T7, and a fourth inverter transistor T8. In case that the potential of the first control node QN is the high potential, the inverter part INV may convert the potential of the second control node QBN to a low potential, and in case that the potential of the first control node QN is the low potential, the inverter part INV may convert the potential of the second control node QBN to the high potential.

The first inverter transistor T5-1 and T5-2 and the second inverter transistor T6 may be disposed between an inverter voltage terminal HVT and the second voltage terminal VT2. The third inverter transistor T7 and the fourth inverter transistor T8 may be disposed between the inverter voltage terminal HVT and the first voltage terminal VT1. The inverter part INV may receive a high voltage VGH greater than the first and second low voltages VSS1 and VSS2 through the inverter voltage terminal HVT.

The first inverter transistor T5-1 and T5-2 may include a first sub-inverter transistor T5-1 and a second sub-inverter transistor T5-2. Gates and sources of the first sub-inverter transistor T5-1 and the second sub-inverter transistor T5-2 may be electrically connected to the inverter voltage terminal HVT.

The second inverter transistor T6 (or a first control transistor) may be electrically connected between a drain of the second sub-inverter transistor T5-2 and the second voltage terminal VT2. The second inverter transistor T6 may include a gate electrically connected to the first control node QN and a first dummy gate DG1 electrically connected to the first voltage terminal VT1.

A source of the third inverter transistor T7 may be electrically connected to the inverter voltage terminal HVT, and a drain of the third inverter transistor T7 may be electrically connected to a drain of the fourth inverter transistor T8. A gate of the third inverter transistor T7 may be electrically connected to the drain of the second sub-inverter transistor T5-2. A source of the fourth inverter transistor T8 (or a second control transistor) may be electrically connected to the drain of the third inverter transistor T7 and a drain of the fourth inverter transistor T8 may be electrically connected to the first voltage terminal VT1. The fourth inverter transistor T8 may include a gate electrically connected to the first control node QN and a second dummy gate DG2 electrically connected to the first voltage terminal VT1.

In case that the potential of the first control node QN is the high potential, the second and fourth inverter transistors T6 and T8 may be turned on. The third inverter transistor T7 may be turned-off by the turned on second inverter transistor T6, and the potential of the second control node QBN may be lowered to the first low voltage VSS1 by the turned-on fourth inverter transistor T8 and may have the low potential.

In case that the potential of the first control node QN is the low potential, the second and fourth inverter transistors T6 and T8 may be turned off. In case that the second and fourth inverter transistors T6 and T8 are turned-off, the potential of the second control node QBN may be not lowered to the first low voltage VSS1 through the fourth inverter transistor T8 and may have the high potential.

In FIG. 8, an x-axis may represent a gate-source voltage Vgs, and a y-axis may represent a source-drain current Ids. Referring to FIG. 8, a first graph Gh1 may represent a source-drain current Ids flowing through the second and fourth inverter transistors T6 and T8 in case that the second and fourth inverter transistors T6 and T8 do not include the first and second dummy gates DG1 and DG2, respectively. A second graph Gh2 may represent a source-drain current Ids flowing through the fourth inverter transistor T8 in case that the fourth inverter transistor T8 includes the second dummy gate DG2. A third graph Gh3 may represent a source-drain current Ids flowing through the second inverter transistor T6 in case that the second inverter transistor T6 includes the first dummy gate DG1.

According to the first graph Gh1, in case that the first and second dummy gates DG1 and DG2 are added to the second and fourth inverter transistors T6 and T8, threshold voltages of the second and fourth inverter transistors T6 and T8 may be shifted in a positive direction. As a result, in case that the second and fourth inverter transistors T6 and T8 are turned off (e.g., in case that the gate-source voltage Vgs is about 0V), magnitudes of the source-drain currents (i.e., a leakage current) of the second and third graphs Gh2 and Gh3 may be greatly reduced compared to a magnitude of the source-drain current Ids of the first graph Gh1. Accordingly, it is possible to prevent one of the first to fourth inverter transistors T5-1, T5-2, T6, T7, and T8 from being burnt (or damaged) due to the leakage current, thereby improving reliability of the scan driving circuit (see, e.g., 300 of FIG. 3).

FIG. 7 illustrates an embodiment that the drain of the fourth inverter transistor T8 and the drain of the second inverter transistor T6 are electrically connected to different voltage terminals (i.e., the first and second voltage terminals VT1 and VT2), respectively, but the disclosure is not limited thereto. In another embodiment, the drain of the fourth inverter transistor T8 and the drain of the second inverter transistor T6 may be commonly connected to one voltage terminal (i.e., the first voltage terminal VT1 or the second voltage terminal VT2). In case that the drain of the fourth inverter transistor T8 and the drain of the second inverter transistor T6 are electrically connected to one voltage terminal, a low voltage lower than or equal to a voltage applied to the one voltage terminal may be applied to the first and second dummy gates DG1 and DG2.

The node pull-up part Q_PU may include a first pull-up transistor T4-1 and a second pull-up transistor T4-2. The first pull-up transistor T4-1 may include a gate and a source which are electrically connected to the input terminal IN receiving a previous carry signal CRj-4. The second pull-up transistor T4-2 may include a gate electrically connected to the input terminal IN and may be electrically connected between a drain of the first pull-up transistor T4-1 and the first control node QN. Therefore, the first and second pull-up transistors T4-1 and T4-2 may be turned-on in response to the previous carry signal CRj-4 and may pull up the potential of the first control node QN to the high potential.

The node pull-down part Q_PD may be electrically connected between the first control node QN and the first voltage terminal VT1 and may be turned on in response to a second next carry signal CRj+4 which is supplied through the second control terminal CT2. The node pull-down part Q_PD may include a first sub pull-down transistor T9-1 and a second sub pull-down transistor T9-2. The first sub pull-down transistor T9-1 may include a source electrically connected to the first control node QN, a drain electrically connected to the drain of the first pull-up transistor T4-1, and a gate receiving the second next carry signal CRj+4. The second sub pull-down transistor T9-2 may include a source electrically connected to the drain of the first sub pull-down transistor T9-1, a drain electrically connected to the first voltage terminal VT1, and a gate receiving the second next carry signal CRj+4. In case that the first and second sub pull-down transistors T9-1 and T9-2 are turned on in response to the second next carry signal CRj+4, the potential of the first control node QN may be lowered to the first low voltage VSS1 through the first and second pull-down transistors T9-1 and T9-2 which are in a turned-on state.

The node holding part Q_HD may be electrically connected between the first control node QN and the first voltage terminal VT1 and may operate in response to the potential of the second control node QBN. The node holding part Q_HD may include a first sub holding transistor T10-1 and a second sub holding transistor T10-2. The first sub holding transistor T10-1 may include a source electrically connected to the first control node QN, a drain electrically connected to the drain of the first pull-up transistor T4-1, and a gate electrically connected to the second control node QBN. The second sub holding transistor T10-2 may include a source electrically connected to the drain of the first sub holding transistor T10-1, a drain electrically connected to the first voltage terminal VT1, and a gate electrically connected to the second control node QBN. In case that the first and second sub holding transistors T10-1 and T10-2 are turned on in response to the high potential of the second control node QBN, the potential of the first control node QN may maintain a holding state having the first low voltage VSS1 through the first and second sub holding transistors T10-1 and T10-2 which are in a turned-on state.

The j-th stage STj may further include a sensing circuit part E_SS. The sensing circuit part E_SS may operate in response to first to fourth operation signals S1, S2, S3, and S4 and may be activated during an external sensing operation of the display device DD. In an embodiment, the sensing circuit part E_SS may include multiple sensing transistor T11-1, T11-2, T12-1, T12-2, T13-1, T13-2, T14, T15, T16, and T17, and a fourth capacitor C4.

Each of the transistors T1-1, T1-2, T1-3, T2-1, T2-2, T2-3, T3-1, T3-2, T3-3, T4-1, T4-2, T5-1, T5-2, T6, T7, T8, T9-1, T9-2, T10-1, T10-2, T11-1, T11-2, T12-1, T12-2, T13-1, T13-2, T14, T15, T16, and T17 disposed in the j-th stage STj may be an oxide semiconductor transistor having an oxide semiconductor layer. Each of the transistors T1-1, T1-2, T1-3, T2-1, T2-2, T2-3, T3-1, T3-2, T3-3, T4-1, T4-2, T5-1, T5-2, T6, T7, T8, T9-1, T9-2, T10-1, T10-2, T11-1, T11-2, T12-1, T12-2, T13-1, T13-2, T14, T15, T16, and T17 may be an N-type transistor, but the disclosure is not limited thereto. In another embodiment, each of the transistors T1-1, T1-2, T1-3, T2-1, T2-2, T2-3, T3-1, T3-2, T3-3, T4-1, T4-2, T5-1, T5-2, T6, T7, T8, T9-1, T9-2, T10-1, T10-2, T11-1, T11-2, T12-1, T12-2, T13-1, T13-2, T14, T15, T16, and T17 may be a P-type transistor.

Figure 9:
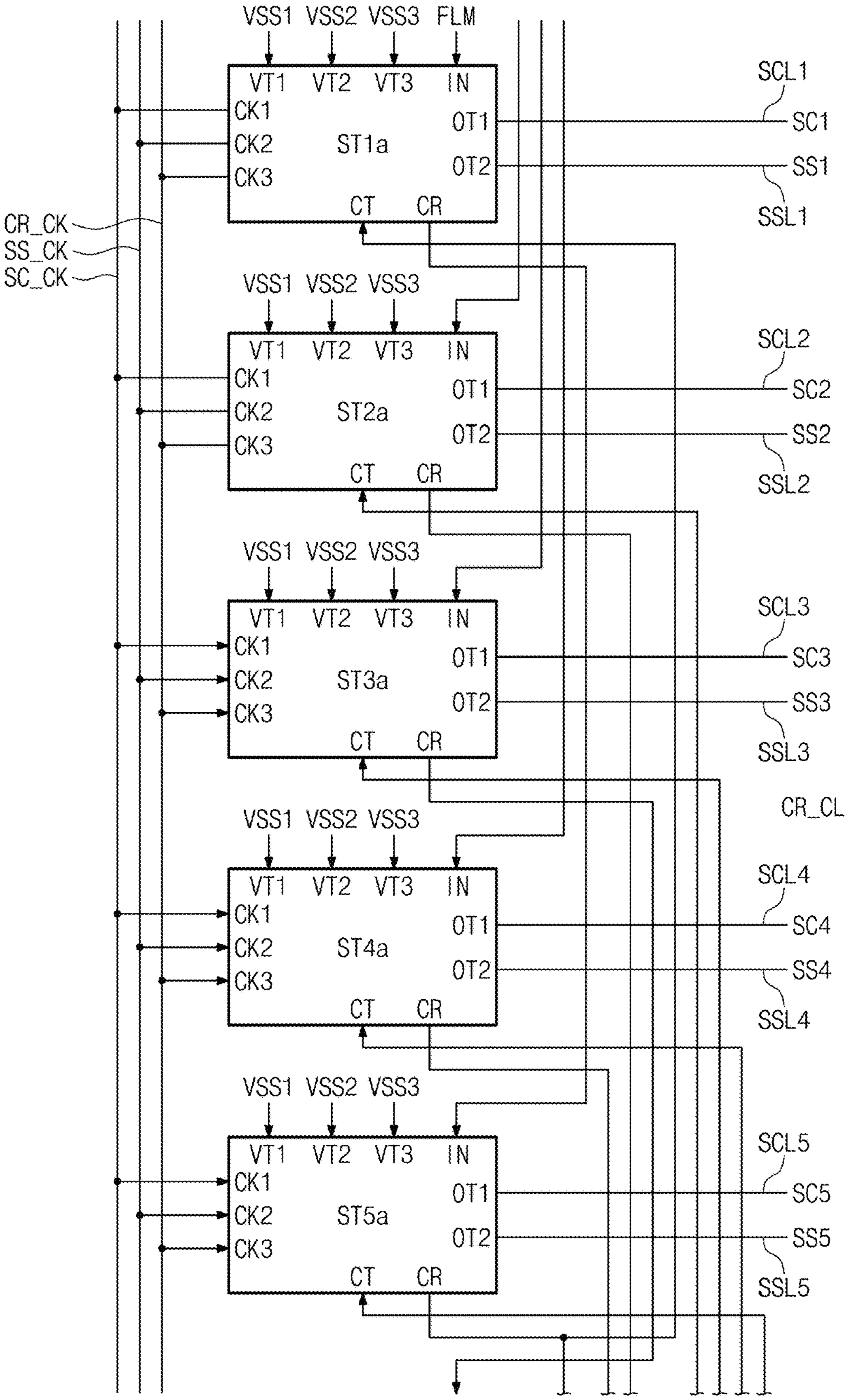
FIG. 9 is a schematic block diagram of a first scan driving circuit according to an embodiment of the disclosure.
Figure 10:
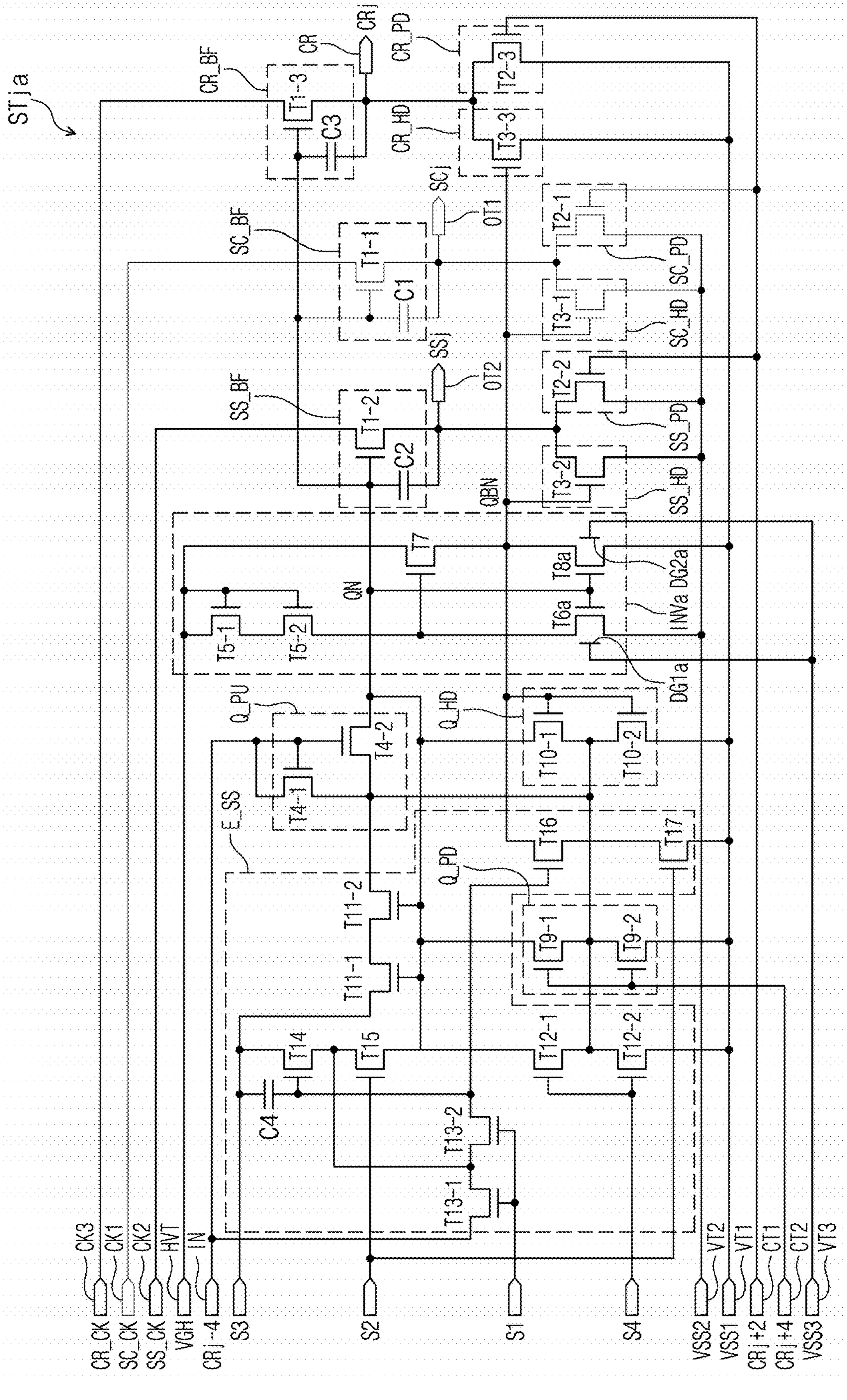
FIG. 10 is a schematic diagram of an equivalent circuit of a j-th stage according to an embodiment of the disclosure.
Figure 11:
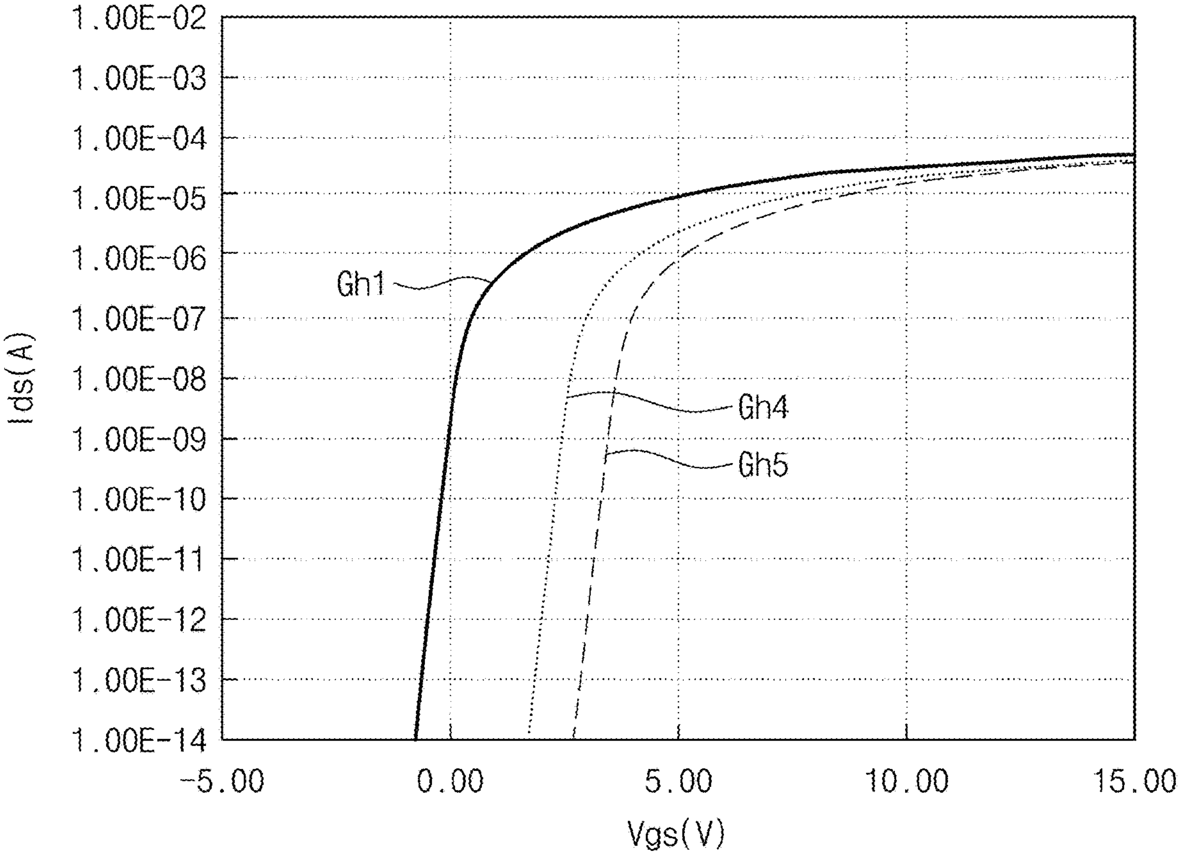
FIG. 11 is a schematic waveform diagram illustrating level of leakage current generated in an inverter part of a scan driving circuit according to an embodiment of the disclosure.

FIG. 9 is a schematic block diagram of a first scan driving circuit according to an embodiment of the disclosure, and FIG. 10 is a schematic diagram of an equivalent circuit of a j-th stage according to an embodiment of the disclosure. FIG. 11 is a schematic waveform diagram illustrating level of leakage current generated in an inverter part of a scan driving circuit according to an embodiment of the disclosure. Among components of FIGS. 9 and 10, the same reference numerals may be given to components identical to components of FIGS. 6 and 7, and detailed descriptions thereof may be omitted.

Referring to FIG. 9, each of the stages ST1*a*, ST2*a*, ST3*a*, ST4*a*, and ST5 may include an input terminal IN, a control terminal CT, a carry terminal CR, a first output terminal OT1, and a second output terminal OT2. Each of the stages ST1*a* to ST5*a* may further include a first clock terminal CK1, a second clock terminal CK2, a third clock terminal CK3, a first voltage terminal VT1, a second voltage terminal VT2, and a third voltage terminal VT3. For example, the stages ST1*a* to ST5*a* of FIG. 9 may further include the third voltage terminal VT3 unlike the stages ST1 to ST5 of FIG. 6.

The third voltage terminal VT3 may receive a third low voltage VSS3. The third low voltage VSS3 and the first and second low voltages VSS1 and VSS2 may have different voltage levels. In an embodiment, a voltage level of the third low voltage VSS3 may be lower than a voltage level of the first low voltage VSS1. For example, in case that the first low voltage is about −9 volts (V), and the second low voltage is about −5 volts (V), a voltage level of the third low voltage VSS3 may be, for example, about −11 volts (V) and lower than about −9 volts (V).

Referring to FIGS. 9 and 10, a j-th stage STja may include multiple buffer parts SC_BF, SS_BF, and CR_BF, multiple holding parts SC_HD, SS_HD, and CR_HD, multiple pull-down parts SC_PD, SS_PD, and CR_PD, an inverter part INVa, a node pull-up part Q_PU, a node pull-down part Q_PD, and a node holding part Q_HD.

Since configurations of the buffer parts SC_BF, SS_BF, and CR_BF, the holding parts SC_HD, SS_HD, and CR_HD, the pull-down parts SC_PD, SS_PD, and CR_PD, the node pull-up part Q_PU, the node pull-down part Q_PD, and the node holding part Q_HD are the same as those shown in FIG. 7, a description thereof may be omitted.

The inverter part INVa may include a first inverter transistor T5-1 and T5-2, a second inverter transistor T6*a*, a third inverter transistor T7, and a fourth inverter transistor T8*a*. The first inverter transistor T5-1 and T5-2 may include a first sub-inverter transistor T5-1 and a second sub-inverter transistor T5-2.

The second inverter transistor T6*a* (or a first control transistor) may be electrically connected between a drain of the second sub-inverter transistor T5-2 and the second voltage terminal VT2. The second inverter transistor T6*a* may include a gate electrically connected to the first control node QN and a first dummy gate DG1*a* electrically connected to the third voltage terminal VT3.

A source of the fourth inverter transistor T8*a* (or a second control transistor) may be electrically connected to a drain of the third inverter transistor T7, and a drain of the fourth inverter transistor T8*a* may be electrically connected to the first voltage terminal VT1. The fourth inverter transistor T8*a* may include a gate electrically connected to the first control node QN and a second dummy gate DG2*a* electrically connected to the third voltage terminal VT3.

In case that the potential of the first control node QN is the high potential, the second and fourth inverter transistors T6*a* and T8*a* may be turned on. The third inverter transistor T7 may be turned-off by the turned on second inverter transistor T6*a*, and the potential of the second control node QBN may be lowered to the first low voltage VSS1 by the turned-on fourth inverter transistor T8*a* and may have the low potential.

In case that the potential of the first control node QN is the low potential, the second and fourth inverter transistors T6*a* and T8*a* may be turned off. In case that the second and fourth inverter transistors T6*a* and T8*a* are turned-off, the potential of the second control node QBN may be not lowered to the first low voltage VSS1 through the fourth inverter transistor T8*a* and may have the high potential.

In FIG. 11, a first graph Gh1 may represent a source-drain current Ids flowing through the second and fourth inverter transistors T6*a* and T8*a* in case that the second and fourth inverter transistors T6*a* and T8*a* do not include the first and second dummy gates DG1*a* and DG2*a*, respectively. A fourth graph Gh4 may represent a source-drain current Ids flowing through the fourth inverter transistor T8*a* in case that the fourth inverter transistor T8*a* includes the second dummy gate DG2*a*. A fifth graph Gh5 may represent a source-drain current Ids flowing through the second inverter transistor T6*a* in case that the second inverter transistor T6*a* includes the first dummy gate DG1*a*.

In case that the first and second dummy gates DG1*a* and DG2*a* are added to the second and fourth inverter transistors T6*a* and T8*a*, threshold voltages of the second and fourth inverter transistors T6*a* and T8*a* may be shifted in a positive direction. As a result, in case that the second and fourth inverter transistors T6*a* and T8*a* are turned off (e.g., in case that the gate-source voltage Vgs is about 0V), magnitudes of the source-drain currents (i.e., a leakage current) of fourth and fifth graphs Gh4 and Gh5 may be greatly reduced compared to a magnitude of the source-drain current Ids of the first graph Gh1. In case that the first and second dummy gates DG1*a* and DG2*a* are electrically connected to the third voltage terminal VT3 receiving the third low voltage VSS3 having a lower voltage level than that of the first low voltage VSS1, the threshold voltage may be further shifted in the positive direction compared to the case (see, e.g., the second and third graphs Gh2 and Gh3 of FIG. 8) that the first and second dummy gates DG1 and DG2 are electrically connected to the first voltage terminal VT1. Accordingly, in case that the first and second dummy gates DG1*a* and DG2*a* are electrically connected to the third voltage terminal VT3, the leakage current may be further reduced, and as a result, a reliability of the scan driving circuit (see, e.g., 300 of FIG. 3) may be further improved.

FIG. 10 illustrates an embodiment that the drain of the fourth inverter transistor T8*a* and the drain of the second inverter transistor T6*a* are connected to different voltage terminals (i.e., the first and second voltage terminals VT1 and VT2), respectively, but the disclosure is not limited thereto. In another embodiment, the drain of the fourth inverter transistor T8*a* and the drain of the second inverter transistor T6*a* may be commonly connected to a voltage terminal (i.e., the first voltage terminal VT1 or the second voltage terminal VT2).

Figure 12:
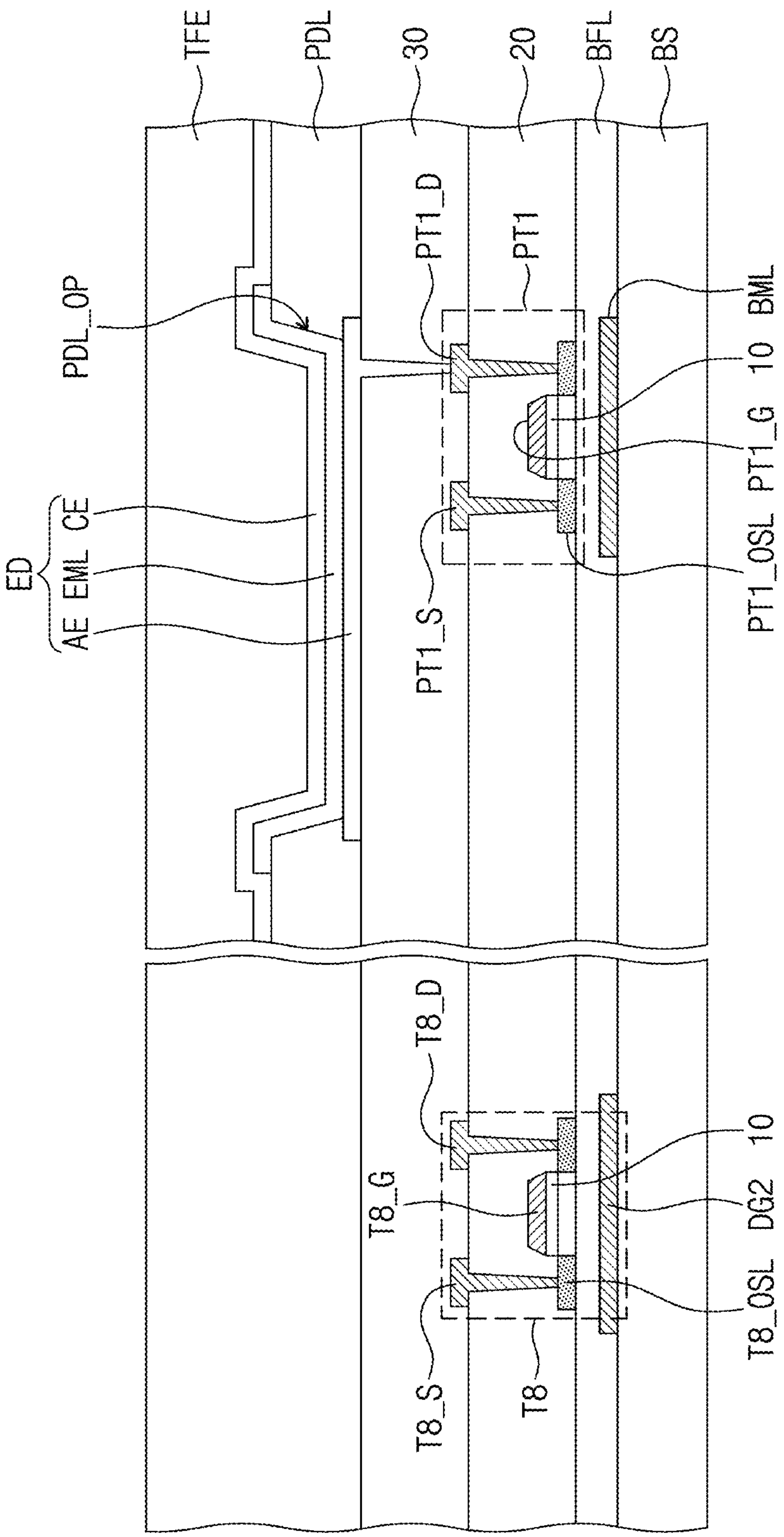
FIG. 12 is a schematic cross-sectional view of a portion of a display panel according to an embodiment of the disclosure.

FIG. 12 is a schematic cross-sectional view of a portion of a display panel according to an embodiment of the disclosure. FIG. 12 illustrates only cross-sectional structures of the first transistor PT1 of the pixel circuit part PXC (see, e.g., FIG. 4A) and the fourth inverter transistor T8 of the scan driving circuit 300 (see, e.g., FIG. 3). However, the second and third transistors PT2 and PT3 (see, e.g., FIG. 4A) may have a cross-sectional structure similar to a cross-sectional structure of the first transistor PT1 and the second inverter transistor T6 may have a cross-sectional structure similar to a cross-sectional structure of the fourth inverter transistor T8.

Referring FIGS. 7 and 12, a shielding electrode BML and the second dummy gate DG2 may be disposed on an upper surface of a base layer BS. The second dummy gate DG2 and the shielding electrode BML may include a same material and may be formed by a same process. For example, the second dummy gate DG2 and shielding electrode BML may be disposed on a same layer (e.g., the base layer BS). Therefore, in order to form the first and second dummy gates DG1 and DG2, an additional process may not be required. As a result, without the additional process, a reliability of the scan driving circuit (see, e.g., 300 of FIG. 3) may be improved.

A buffer layer BFL may be disposed on base layer BS and may cover the shielding electrode BM and the second dummy gate DG2. The buffer layer BFL may include a silicon oxide layer and a silicon nitride layer. The silicon oxide layer and the silicon nitride layer may be alternately stacked each other.

Semiconductor patterns PT1_OSL and T8_OSL may be disposed on the buffer layer BFL. Each of the semiconductor patterns PT1_OSL and T8_OSL may be one of multiple patterns formed from a semiconductor layer that is disposed on the buffer layer BFL. A semiconductor pattern PT1_OSL may overlap the shielding electrode BML in a plan view. Therefore, the shielding electrode BML may block the light from being provided to the semiconductor pattern PT1_OSL. A semiconductor pattern T8_OSL may overlap the second dummy gate DG2 in a plan view. The second dummy gate DG2 may be electrically connected to the first voltage terminal (see, e.g., VT1 of FIG. 7) and may receive the first low voltage (see, e.g., VSS1 of FIG. 7). Also, since the second dummy gate DG2 and the shielding electrode BML are formed of a same material, the second dummy gate DG2 may have a function of blocking the light from being provided to the semiconductor pattern T8_OSL.

The semiconductor patterns PT1_OSL and T8_OSL may include a metal oxide. The semiconductor patterns PT1_OSL and T8_OSL may include a metal oxide semiconductor such as a crystalline semiconductor, amorphous oxide semiconductor, the like, or a combination thereof. For example, the semiconductor patterns PT1_OSL and T8 may include a metal oxide semiconductor including a metal oxide including zinc (Zn), indium (In), gallium (Ga), tin (Sn), titanium (Ti), or the like, a mixture of a metal, such as zinc (Zn), indium (In), gallium (Ga), tin (Sn), titanium (Ti), or the like, or an oxide thereof. The semiconductor patterns PT1_OSL and T8_OSL may include a metal oxide semiconductor including indium-tin oxide (ITO), indium-gallium-zinc oxide (IGZO), zinc oxide (ZnO), indium-zinc oxide (IZnO), zinc-indium oxide (ZIO), indium oxide (InO), titanium oxide (TiO), indium-zinc-tin oxide (IZTO), zinc-tin oxide (ZTO), the like, or a combination thereof.

Each of the semiconductor patterns PT1_OSL and T8_OSL may include multiple regions that are distinguished depending on whether the metal oxide is reduced. A region (hereinafter referred to as a "reduction region") in which the metal oxide is reduced may have greater conductivity than an area (hereinafter referred to as a "non-reduction region") in which the metal oxide is not reduced. The reduction region may substantially serve as a source or drain of a transistor or a signal line. The non-reduction region may substantially correspond to a semiconductor region (or a channel) of a transistor. For example, a portion of the semiconductor pattern may be the semiconductor region of the transistor, another portion of the semiconductor pattern may be a source region or a drain region of the transistor, and a remaining portion of the semiconductor pattern may be a signal transfer region.

Each of the semiconductor patterns PT1_OSL and T8_OSL may include a source region, a drain region, and a channel region (or a semiconductor region). The channel region may be disposed between the source region and the drain region. The source region of the semiconductor pattern PT1_OSL may be electrically connected to a source PT1_S of the first transistor PT1, and the drain region of the semiconductor pattern PT1_OSL may be electrically connected to a drain PT1_D of the first transistor PT1. The source region of the semiconductor pattern T8_OSL may be electrically connected to a source T8_S of the fourth inverter transistor T8, and the drain region of the semiconductor pattern T8_OSL may be electrically connected to a drain T8_D of the fourth inverter transistor T8.

A gate insulating layer 10 may be disposed on the semiconductor patterns PT1_OSL and T8_OSL. The gate insulating layer 10 may overlap the channel region in a plan view. In an embodiment, the gate insulating layer 10 may not be formed (e.g., fully formed) on the base layer BS, but may overlap only a portion of a conductive pattern (e.g., a specific conductive pattern) described below in a plan view. However, the disclosure is not limited thereto, in another embodiment, the gate insulating layer 10 may fully overlap the base layer BS in a plan view.

A gate PT1_G of the first transistor PT1 and a gate T8_G of the fourth inverter transistor T8 may be disposed on the gate insulating layer 10. A first insulating layer 20 may be disposed on the buffer layer BFL and may cover the semiconductor patterns PT1_OSL and T8_OSL, the gate PT1_G of the first transistor PT1, and the gate T8_G of the fourth inverter transistor T8.

The source PT1_S and the drain PT1_D of the first transistor PT1 and the source T8_S and the drain T8_D of the fourth inverter transistor T8 may be disposed on the first insulating layer 20. The source PT1_S and the drain PT1_D of the first transistor PT1 may contact the source region and the drain region of the semiconductor pattern PT1_OSL through contact holes penetrating the first insulating layer 20, respectively. The source T8_S and the drain T8_D of the fourth inverter transistor T8 may contact the source region and the drain region of the semiconductor pattern T8_OSL through contact holes penetrating the first insulating layer 20, respectively.

A second insulating layer 30 may be disposed on the first insulating layer 20 and may cover the source PT1_S and the drain PT1_D of the first transistor PT1 and the source T8_S and the drain T8_D of the fourth inverter transistor T8. The light emitting element ED may be disposed on the second insulating layer 30.

The light emitting element ED may include a first electrode AE, an emission layer EL, and a second electrode CE. The first electrode AE may be disposed on the second insulating layer 30. The first electrode AE may contact the drain PT1_D of the first transistor PT1 through a contact hole penetrating the second insulating layer 30. In another embodiment, a connection electrode may be further disposed between the drain PT1_D of the first transistor PT1 and the first electrode AE.

A pixel defining layer PDL may be disposed on the second insulating layer 30 and may cover a portion of the first electrode AE. An opening portion PDL_OP may be provided in the pixel defining layer PDL. The opening portion PDL_OP of the pixel defining layer PDL may expose at least a portion of the first electrode AE.

The emission layer EL may be disposed on the first electrode AE. The emission layer EL may be disposed in an area corresponding to the opening portion PDL_OP. The emission layer EL may be formed for each of the pixels PX. In case that the emission layer EL is formed for each of the pixels PX, each of multiple emission layers EL may emit a light having one of a red color, a blue color, and a green color. However, the disclosure is not limited thereto, and in another embodiment, the emission layers EL may be electrically connected to each other in an integral shape and commonly provided on the pixels PX. The emission layer EL that is provided in the integral shape may generate a white light or a blue light.

The second electrode CE may be disposed on the emission layer EL. The second electrode CE may have an integral shape and may be disposed in the pixels PX in common.

An encapsulation layer TFE may be disposed on the second electrode CE. The encapsulation layer TFE may include an inorganic layer, an organic layer, and an inorganic layer that are sequentially stacked, but layers constituting the encapsulation layer TFE are not limited thereto. The encapsulation layer TFE including the inorganic layer may protect the light emitting element ED from moisture and oxygen, and the encapsulation layer TFE including the organic layer may protect the light emitting element ED from foreign substances such as dust particles or the like. The encapsulation layer TFE may include an inorganic layer such as a silicon nitride layer, a silicon oxynitride layer, a silicon oxide layer, an aluminum oxide layer, the like, or a combination thereof. The encapsulation layer TFE may include an organic layer such as an acrylic-based organic layer or the like, but the disclosure is not limited thereto.

As described above, as the dummy gate is additionally disposed on the control transistor (i.e., the second inverter transistor T6 or the fourth inverter transistor T8) included in the inverter part INV, the threshold voltage of the control transistor may be shifted in a positive direction. As a result, the amount of leakage current leaking through the control transistor may be reduced, and the burnt phenomenon of the transistor due to the leakage current may be reduced, thereby improving reliability of the scan driving circuit 300.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A scan driving circuit comprising a plurality of stages, each of the plurality of stages comprising:

a buffer part which is electrically connected to an output terminal and operates in response to a potential of a first control node;

a holding part which is electrically connected to the output terminal and operates in response to a potential of a second control node; and an inverter part which is electrically connected to the first and second control nodes and controls the potentials of the first and second control nodes, wherein the inverter part comprises: a control transistor including:

a gate electrically connected to the first control node; and a drain electrically connected to a first voltage terminal that receives a first low voltage or a second voltage terminal that receives a second low voltage, and the control transistor further includes a dummy gate that receives a low voltage lower than or equal to the first and second low voltages.

2. The scan driving circuit of claim 1, wherein a voltage level of the first low voltage is lower than a voltage level of the second low voltage, and the dummy gate is electrically connected to the first voltage terminal.

3. The scan driving circuit of claim 1, wherein the dummy gate is electrically connected to a third voltage terminal that receives a third low voltage having a voltage level lower than a voltage level of the first low voltage.

4. The scan driving circuit of claim 1, wherein the control transistor comprises:

a first control transistor including a gate electrically connected to the first control node and electrically connected between an inverter voltage terminal and the second voltage terminal; and a second control transistor including a gate electrically connected to the first control node and electrically connected between the second control node and the first voltage terminal.

5. The scan driving circuit of claim 4, wherein the first control transistor further includes a first dummy gate electrically connected to the first voltage terminal, and the second control transistor further includes a second dummy gate electrically connected to the first voltage terminal.

6. The scan driving circuit of claim 5, wherein a voltage level of the first low voltage is lower than a voltage level of the second low voltage.

7. The scan driving circuit of claim 4, wherein the first control transistor further includes a first dummy gate electrically connected to a third voltage terminal that receives a third low voltage, and the second control transistor further includes a second dummy gate electrically connected to the third voltage terminal.

8. The scan driving circuit of claim 7, wherein a voltage level of the third low voltage is lower than a voltage level of the first low voltage, and the voltage level of the first low voltage is lower than a voltage level of the second low voltage.

9. The scan driving circuit of claim 1, wherein the buffer part comprises a buffer transistor including a gate electrically connected to the first control node and electrically connected between a clock terminal and the output terminal, and the holding part comprises a holding transistor including a gate electrically connected to the second control node and electrically connected between the output terminal and the second voltage terminal.

10. A display device comprising:

a plurality of pixels disposed on a base layer; and a scan driving circuit disposed on the base layer and electrically connected to the plurality of pixels, wherein the scan driving circuit comprises a plurality of stages, each of the plurality of stages comprises:

a buffer part which is electrically connected to an output terminal and operates in response to a potential of a first control node;

a holding part which is electrically connected to the output terminal and operates in response to a potential of a second control node; and an inverter part which is electrically connected to the first and second control nodes and controls the potentials of the first and second control nodes, the inverter part comprises: a control transistor including:
a gate electrically connected to the first control node; and
a drain electrically connected to a first voltage terminal that receives a first low voltage or a second voltage terminal that receives a second low voltage, and
the control transistor further includes a dummy gate that receives a low voltage lower than or equal to the first and second low voltages.

11. The display device of claim 10, wherein
a voltage level of the first low voltage is lower than a voltage level of the second low voltage, and
the dummy gate is electrically connected to the first voltage terminal.

12. The display device of claim 10, wherein the dummy gate is electrically connected to a third voltage terminal that receives a third low voltage having a voltage level lower than a voltage level of the first low voltage.

13. The display device of claim 10, wherein the control transistor comprises:
a first control transistor including a gate electrically connected to the first control node and electrically connected between an inverter voltage terminal and the second voltage terminal; and
a second control transistor including a gate electrically connected to the first control node and electrically connected between the second control node and the first voltage terminal.

14. The display device of claim 13, wherein
the first control transistor further includes a first dummy gate electrically connected to the first voltage terminal, and
the second control transistor further includes a second dummy gate electrically connected to the first voltage terminal.

15. The display device of claim 14, wherein a voltage level of the first low voltage is lower than a voltage level of the second low voltage.

16. The display device of claim 13, wherein
the first control transistor further includes a first dummy gate electrically connected to a third voltage terminal that receives a third low voltage, and
the second control transistor further includes a second dummy gate electrically connected to the third voltage terminal.

17. The display device of claim 16, wherein
a voltage level of the third low voltage is lower than a voltage level of the first low voltage, and
the voltage level of the first low voltage is lower than a voltage level of the second low voltage.

18. The display device of claim 10, wherein
the buffer part comprises a buffer transistor including a gate electrically connected to the first control node and electrically connected between a clock terminal and the output terminal, and
the holding part comprises a holding transistor including a gate electrically connected to the second control node and electrically connected between the output terminal and the second voltage terminal.

19. The display device of claim 10, wherein
each of the plurality of pixels comprises:
a light emitting element; and
a pixel circuit part electrically connected to the light emitting element, and
the pixel circuit part comprises:
at least one transistor; and
a shielding electrode overlapping a semiconductor pattern of the at least one transistor in a plan view.

20. The display device of claim 19, wherein the dummy gate and the shielding electrode are disposed on a same layer.

21. An electronic device comprising a display device, the display device comprising:
a plurality of pixels disposed on a base layer; and
a scan driving circuit disposed on the base layer and electrically connected to the plurality of pixels, wherein
the scan driving circuit comprises a plurality of stages,
each of the plurality of stages comprises:
a buffer part which is electrically connected to an output terminal and operates in response to a potential of a first control node;
a holding part which is electrically connected to the output terminal and operates in response to a potential of a second control node; and
an inverter part which is electrically connected to the first and second control nodes and controls the potentials of the first and second control nodes, the inverter part comprises: a control transistor including:
a gate electrically connected to the first control node; and
a drain electrically connected to a first voltage terminal that receives a first low voltage or a second voltage terminal that receives a second low voltage, and
the control transistor further includes a dummy gate that receives a low voltage lower than or equal to the first and second low voltages.

* * * * *